(12) United States Patent
Ito et al.

(10) Patent No.: US 12,313,427 B2
(45) Date of Patent: May 27, 2025

(54) MAP DATA GENERATION DEVICE

(71) Applicant: PIONEER CORPORATION, Tokyo (JP)

(72) Inventors: Yuji Ito, Kawagoe (JP); Toshiaki Inoue, Kawagoe (JP); Koji Shibata, Kawagoe (JP); Ryohei Kagawa, Kawagoe (JP); Wataru Onodera, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 171 days.

(21) Appl. No.: 17/642,883

(22) PCT Filed: Jan. 14, 2021

(86) PCT No.: PCT/JP2021/000981
§ 371 (c)(1),
(2) Date: Mar. 14, 2022

(87) PCT Pub. No.: WO2021/181861
PCT Pub. Date: Sep. 16, 2021

(65) Prior Publication Data
US 2022/0404169 A1    Dec. 22, 2022

(30) Foreign Application Priority Data
Mar. 10, 2020    (JP) .................................. 2020-040998

(51) Int. Cl.
*G01C 21/00*    (2006.01)
(52) U.S. Cl.
CPC ...... *G01C 21/3844* (2020.08); *G01C 21/3811* (2020.08)
(58) Field of Classification Search
CPC .. G06V 10/82; G06V 10/462; G06V 30/1437; G06V 20/58; G01C 21/3811;
(Continued)

(56) References Cited

U.S. PATENT DOCUMENTS

2010/0329508 A1 * 12/2010 Chen ...................... G06V 20/39
707/715
2016/0117947 A1 * 4/2016 Misu ................... B60W 50/085
434/62
(Continued)

FOREIGN PATENT DOCUMENTS

JP    2006-258656    9/2006
JP    2014-191774    10/2014
(Continued)

OTHER PUBLICATIONS

International Search Report for PCT/JP2021/000981 dated Apr. 6, 2021, 5 pages.
(Continued)

*Primary Examiner* — Stephen Holwerda
(74) *Attorney, Agent, or Firm* — NIXON & VANDERHYE

(57) ABSTRACT

A point which requires visual attention is added to map data. A map data generation device acquires image data in which the outside is captured from a vehicle by an input device and a point data of the vehicle, associates both data, and generates a visual saliency map acquired by estimating fluctuation of visual saliency based on the image data by the visual saliency extraction unit. Then, whether or not a point or a section indicated by position information corresponding to the visual saliency map is a point or a section which requires visual attention is analyzed based on the visual saliency map by an analysis unit, and the point or the section which requires the visual attention is added to the map data based on an analysis result of the analysis unit by an addition device.

13 Claims, 23 Drawing Sheets

(58) Field of Classification Search
CPC .. G01C 21/3848; G01C 21/3844; G06T 7/73; G06T 2207/20084; G06T 2207/30252; G06T 2207/10016
See application file for complete search history.

(56) References Cited

U.S. PATENT DOCUMENTS

| | | | |
|---|---|---|---|
| 2018/0225554 A1 | 8/2018 | Tawari et al. | |
| 2018/0362053 A1* | 12/2018 | Isa | G02B 27/00 |
| 2019/0256084 A1* | 8/2019 | Lee | B60T 7/12 |
| 2020/0097754 A1* | 3/2020 | Tawari | G06V 10/82 |

FOREIGN PATENT DOCUMENTS

| | | |
|---|---|---|
| JP | 2019-067421 | 4/2019 |
| JP | 2019-523509 | 8/2019 |
| JP | 2019-168438 | 10/2019 |

OTHER PUBLICATIONS

Written Opinion of the ISA for PCT/JP2021/000981 dated Apr. 6, 2021, 4 pages.

European Extended Search Report, issued in Europe Patent Application No. 21768828.2 dated Jun. 11, 2024.

Frintrop et al., "Attentional Landmark Selection for Visual SLAM", Proceedings of the 2006 IEEE/RSJ International Conference on Intelligent Robots and Systems, Oct. 9-15, 2006, pp. 2582-2587.

Fritsch et al., "Towards a Human-like Vision System for Driver Assistance", 2008 IEEE Intelligent Vehicles Symposium Eindhoven University of Technology Eindhoven, The Netherlands, Jun. 4-6, 2008, pp. 275-282.

Ouerhani et al., "Robot Self-localization Using Visual Attention", Proceedings 2005 IEEE International Symposium on Computational Intelligence in Robotics and Automation, Jun. 27-30, 2005, pp. 309-314.

* cited by examiner

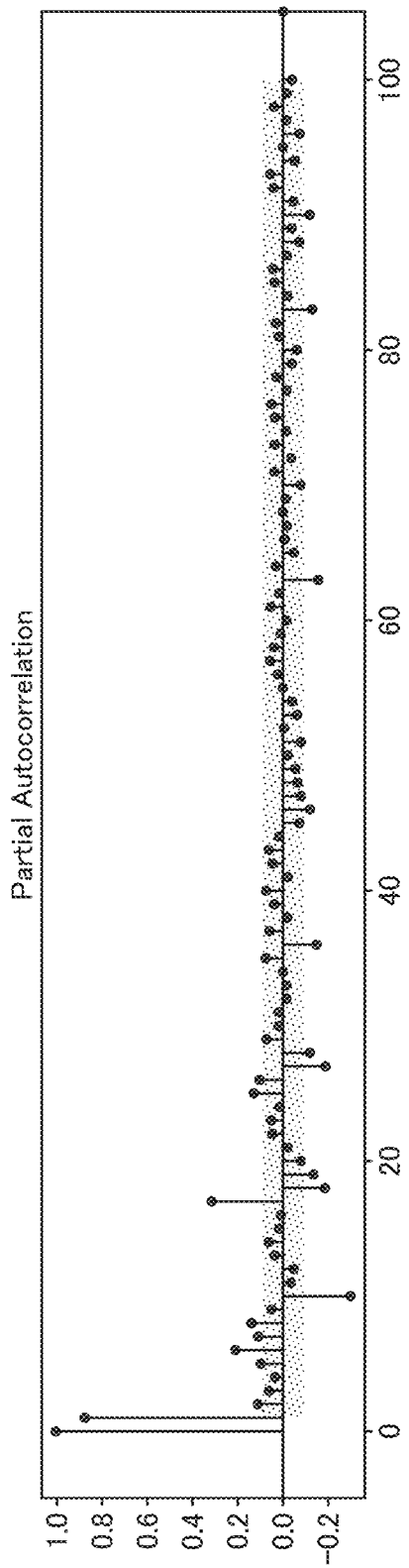
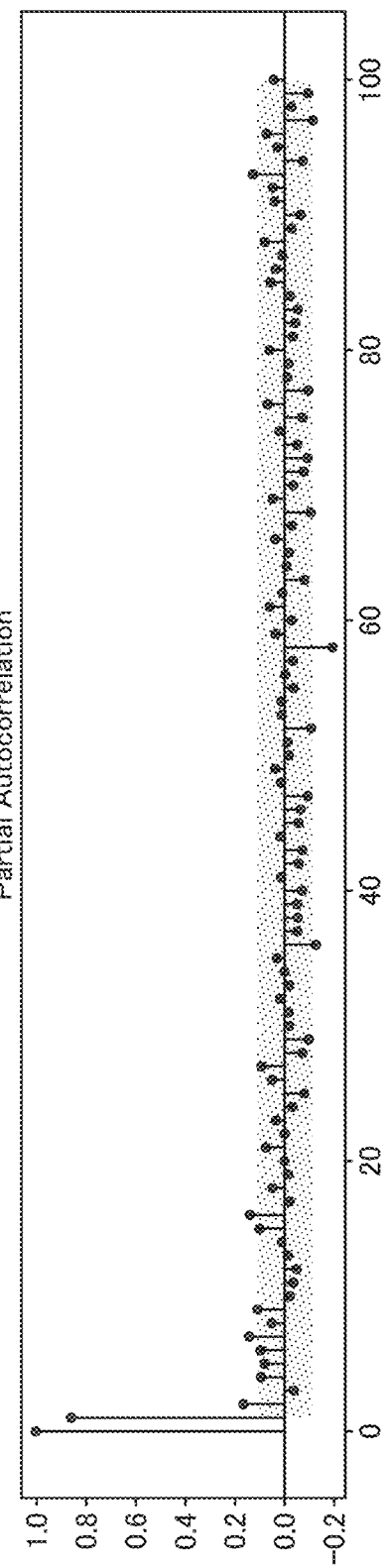
FIG. 28A
FIG. 28B

MAP DATA GENERATION DEVICE

CROSS-REFERENCE TO RELATED APPLICATIONS

This application is the U.S. national phase of International Application No. PCT/JP2021/000981 filed Jan. 14, 2021 which designated the U.S. and claims priority to Japanese Patent Application No. 2020-040998 filed Mar. 10, 2020, the entire contents of each of which are hereby incorporated by reference.

BACKGROUND OF THE INVENTION

Field of the Invention

This invention relates to a map data generation device which adds predetermined information to map data based on an image in which the outside is captured from a mobile object.

Description of the Related Art

When a mobile object, for example, a vehicle, travels, it is conventionally known to indicate on a map a point such as an intersection at which an accident easily occurs, a railroad crossing, a sharp bend or the like on which the vehicle should particularly carefully travels, such as in Japanese Unexamined Patent Application Publication No. 2006-258656

SUMMARY OF THE INVENTION

The point on which the vehicle should carefully travel is not limited to the intersection at which an accident easily occurs, the railroad crossing, and the sharp bend as described above. For example, even if there is no sharp bend or the like, attention is required when stress is visually felt, a risk of distracted driving is high, travelling on a monotonous road or the like.

An example of the problems to be solved by the present invention is to add to map data a point or the like which requires visual attention.

In order to solve the problem mentioned above, the invention includes:
  a first acquisition unit acquiring input information in which an image in which an outside is captured from a mobile object and position information of the mobile object are associated;
  a second acquisition unit acquiring visual saliency distribution information obtained by estimating a level of visual saliency in the image based on the image;
  an analysis unit analyzing, based on the visual saliency distribution information, whether or not a point or a section indicated by the position information corresponding to the visual saliency distribution information is a point or a section which requires visual attention; and
  an addition unit adding, to map data, the point or the section which requires the visual attention to map data, wherein the adding is performed based on an analysis result of the analysis unit.

Also disclosed is a map data generating method executed by a map data generation device, the map data generation device adding predetermined information to map data based on an image in which an outside is captured from a mobile object, the map data generating method including:
  a first acquisition step acquiring input information in which the image and the position information of the mobile object are associated;
  a second acquisition step acquiring visual saliency distribution information obtained by estimating a level of visual saliency in the image based on the image;
  an analysis step analyzing, based on the visual saliency distribution information, whether or not a point or a section indicated by the position information corresponding to the visual saliency distribution information is a point or a section which requires visual attention; and
  an addition step adding, to map data, the point or the section which requires the visual attention, wherein the adding is performed based on an analysis result of the analysis step.

Other inventions, such as a computer to execute the map data generating method and a device to store the map data generating program are also disclosed.

BRIEF DESCRIPTION OF THE DRAWINGS

FIG. 28A is an example of an arithmetic result of an autocorrelation.

FIG. 28B is an example of an arithmetic result of an autocorrelation.

DESCRIPTION OF EMBODIMENTS

Figure 1:
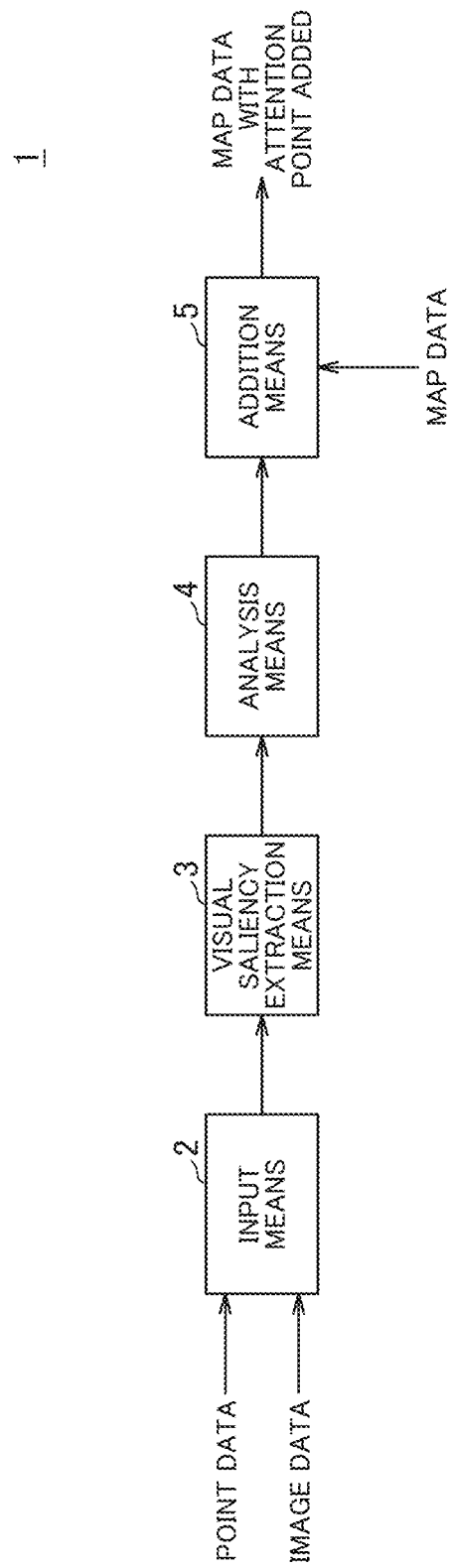
FIG. 1 is a functional configuration diagram of a map data generation device according to one example of the present invention.

A map data generation device according to one embodiment of the present invention will be explained below. In the map data generation device according to the one embodiment of the present invention, a first acquisition unit acquires input information in which an image in which the outside is captured from a mobile object and position information of the mobile object are associated, and based on the image, a second acquisition unit acquires visual saliency distribution information obtained by estimating a level of visual saliency in the image. Then, based on an analysis result of the analysis unit, an analysis unit analyzes whether or not a point or a section indicated by the position information corresponding to the visual saliency distribution information is a point or a section which requires visual attention based on the visual saliency distribution information and an addition unit adds, to map data, the point or the section which requires the visual attention. Thus, visual saliency is estimated based on the image in which the outside is captured from the mobile object, and it is possible to add the point or the section which requires the visual attention to the map data based on the estimated feature.

Further, the analysis unit may include a movement amount calculation unit which calculates a movement amount of an estimated gazing point based on the visual saliency distribution information and a first determination unit which determines whether or not a visual recognition load tends to be high at the point or the section indicated by the position information corresponding to the visual saliency distribution information by comparing a movement amount of the calculated estimated gazing point with a first threshold value, the addition unit may add, to the map data, the point or the section which is determined to have a tendency of having the high visual recognition load as the point or the section which requires the visual attention. Thus, whether or not there is the tendency that the visual recognition load is high can be easily determined by comparing the movement amount of the calculated estimated gazing point with the first threshold value, and based on this determination result, it is possible to add, to the map data, the point or the like which requires visual attention.

Further, the movement amount calculation unit may calculate the movement amount by estimating that the estimated gazing point is a position on an image in which the visual saliency becomes the maximum value in the visual saliency distribution information. Thus, it is possible to calculate the movement amount based on a position which is estimated to be visually recognized the most.

Further, the analysis unit may include: a sight line position setting unit setting a reference sight line position in the image according to a predetermined rule; a visual attention concentration degree calculation unit which calculates a concentration degree of visual attention in the image based on the visual saliency distribution information and a reference sight line position and a second determination unit which determines, based on the concentration degree of the visual attention, whether or not the point or the section indicated by the position information corresponding to the visual saliency distribution information is the point or the section which requires the visual attention, and the addition unit may add, to the map data, the point or the section determined as the point or the section which requires the visual attention. Thus, the point or the like which requires the visual attention is determined based on the concentration degree of the visual attention obtained from the visual saliency distribution information, and the point or the like can be added to the map data.

Further, the second acquisition unit may acquire the visual saliency distribution information for each approach path from an image of each approach path which is a road to enter an intersection, with respect to the visual saliency distribution information, the sight line position setting unit may respectively set the reference sight line position in the image for each exit path which is a road to get out after entering the intersection, the visual attention concentration degree calculation unit may calculate the concentration degree of the visual attention for each exit path in the image based on the visual saliency distribution information and the reference sight line position, and the second determination unit may determine, based on the concentration degree of the visual attention for each exit path, whether or not the intersection is the point which requires the visual attention. Thus, whether or not the intersection is the point which requires the visual attention is determined, and the intersection can be added to the map data.

Further, the analysis unit may include: a peak position detection unit detecting at least one peak position in the visual saliency distribution information in a time sequence; a gazing range setting unit setting a range to be gazed at by a driver of the mobile object in the image; a looking-aside output unit outputting information that there is a tendency of looking-aside in a case where the peak position is continuously out of the range to be gazed at for predetermined time or longer; and a third determination unit which performs determination whether or not the point or the section indicated by the position information corresponding to the visual saliency distribution information is the point or the section which requires the visual attention, wherein the determination is performed based on the information that there is a tendency of looking-aside, and the addition unit may add, to the map data, the point or the section determined as the point or the section which requires the visual attention. Thus, the point or the like having the tendency of looking-aside is determined as the point or the like which requires the attention, and the point or the like can be added to the map data.

Further, the analysis unit may include: a monotone determination unit which, by using a statistical amount calculated based on the visual saliency distribution information, determines whether or not the image has the monotonous tendency; and a fourth determination unit which determines, based on a determination result of the monotone determination unit, whether or not the point or the section indicated by the position information corresponding to the visual saliency distribution information is the point or the section which requires the visual attention, and the addition unit may add, to the map data, the point or the section determined as the point or the section which requires the visual attention. Thus, the point or the like determined to have the monotonous tendency is determined as the point or the like which requires the attention, and the point or the like can be added to the map data.

Further, a second acquisition unit may include: an input unit converting an image to mappable intermediate data; a nonlinear mapping unit converting the intermediate data to mapping data; and an output unit generating saliency estimation information indicating a saliency distribution based on the mapping data, and the nonlinear mapping unit may include: a feature extraction unit which performs an extraction of a feature with respect to the intermediate data; and an up-sampling unit which performs up-sampling of data generated by the feature extraction unit. Thus, the visual saliency can be estimated with a small calculation cost.

Further, in a map data generation method according to the one embodiment of the present invention, in a first acquisition step, input information is acquired in which an image in which an outside is captured from a mobile object and position information of the mobile object are associated, and in a second step, a visual saliency distribution information is acquired based on the image in a second acquisition step, wherein the visual saliency distribution information has been obtained by estimating a level of visual saliency in the image. Then, in an analysis step, it is analyzed based on the visual saliency distribution information whether or not the point or the section indicated by the position information corresponding to the visual saliency distribution information is the point or the section which requires the visual attention, and the point or the section which requires the visual attention is added to the map data based on the analysis result of the analysis step in an addition step. Thus, the visual saliency can be estimated based on the image in which the outside is captured from the mobile object, and the point or the like which requires the visual attention can be added to the map data based on the estimated feature.

In addition, the map data generating method described above is executed by a computer. Thus, the visual saliency is estimated based on the image in which the outside is captured from the mobile object by using the computer, and the point or the like which requires the visual attention can be added to the map data based on the estimated feature.

Further, the map data generating program described above may be stored in a computer-readable storage medium. Thus, the program can be distributed as a single unit in addition to being incorporated into the device, and version upgrades can be easily performed.

Example 1

A map data generation device according to one example of the present invention is described with reference to FIGS. 1 to 11. The map data generation device according to the present example can be configured of a server device or the like arranged in, for example, an office or the like.

As shown in FIG. 1, a map data generation device 1 includes an input means 2, a visual saliency extraction means 3, an analysis means 4, and an addition means 5.

The input means 2 receives an image (moving image) captured by, for example, a camera or the like and position information (point data) outputted from a GPS (Global Positioning System) receiver or the like, and the input means 2 associates the image with the point data and outputs the image. Note that the inputted moving image is outputted as, for example, image data which is decomposed into a time sequence, e.g. for each frame or the like.
A still image may be inputted as an image inputted to the input means 2, however, it is preferable to input as an image group formed of a plurality of still images along a time sequence.

The images inputted to the input means 2 are, for example, images in which a traveling direction of a vehicle is captured. That is, the images are images in which the outside is continuously captured from the vehicle. The image may be an image(s) which include a horizontal direction(s) other than the traveling direction, such as 180 degrees or 360 degrees, for example a so-called panorama image or images acquired by using a plurality of cameras. In addition, images inputted to the input means 2 may not be limited to images captured by a camera which are directly inputted but may be images read out from a storage medium such as a hard disc drive or a memory card or the like. That is, the input means 2 functions as a first acquisition unit which acquires input information in which the image in which the outside is captured from the mobile object and the position information of the mobile object are associated.

In the visual saliency extraction means 3, image data is inputted from the input means 2, and a visual saliency map is outputted as visual saliency estimation information which is described later. That is, the visual saliency extraction means 3 functions as a second acquisition unit which acquires the visual saliency map (visual saliency distribution information) obtained by estimating a level of visual saliency based on the image in which the outside is captured from the mobile object.

Figure 2:
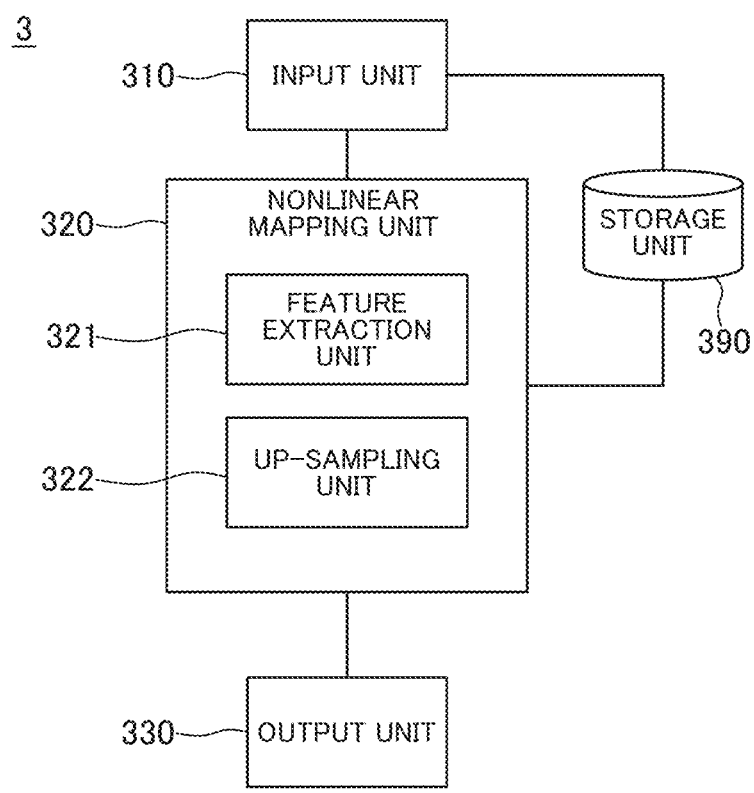
FIG. 2 is a block diagram which exemplifies a configuration of a visual saliency extraction means shown in FIG. 1.

FIG. 2 is a block diagram which exemplifies a configuration of the visual saliency extraction means 3. The visual saliency extraction means 3 according to the present example includes an input unit 310, a nonlinear mapping unit 320, and an output unit 330. The input unit 310 converts an image to mappable intermediate data. The nonlinear mapping unit 320 converts the intermediate data to the mapping data. The output unit 330 generates, based on the mapping data, saliency estimation information which indicates saliency distribution. Then, the nonlinear mapping unit 320 includes a feature extraction unit 321 which performs extraction of a feature with respect to the intermediate data and an up-sampling unit 322 which performs up-sampling of data generated by the feature extraction unit 321. A detailed description will be provided below.

Figure 3B:
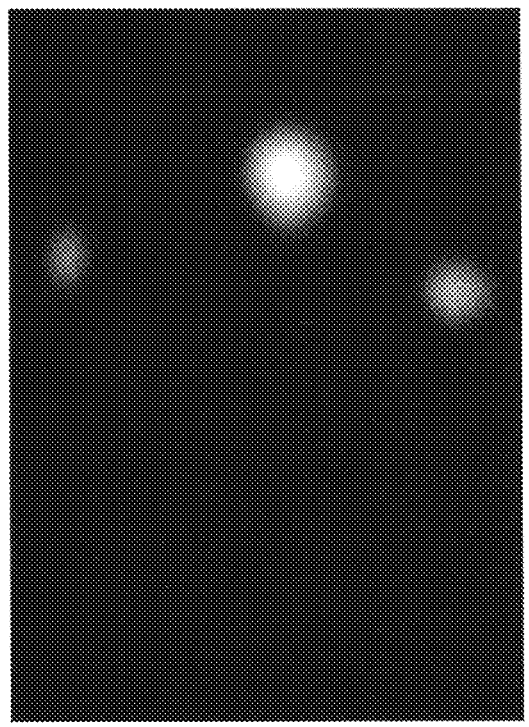
FIG. 3B is a view which exemplifies a visual saliency map estimated with respect to FIG. 3A.
Figure 3A:
FIG. 3A is a view which exemplifies an image to be inputted to a determination device.

FIG. 3A is a view which exemplifies an image to be inputted to the visual saliency extraction means 3, and FIG. 3B is a view which exemplifies an image indicating the visual saliency distribution estimated with respect to FIG. 3A. The visual saliency extraction means 3 according to the present example is a device which estimates visual saliency of each portion in an image. The visual saliency means, for example, conspicuousness or easiness of catching people's eyes. Specifically, the visual saliency is indicated by a probability or the like. Here, that the probability is high or low corresponds to, for example, a high/low probability that a sight line of a person who looks at the image is oriented to the position.

Respective positions in FIG. 3A and FIG. 3B correspond to each other. Then, the position with higher visual saliency in FIG. 3A is indicated as higher luminance in FIG. 3B. The image indicating the visual saliency distribution such as FIG. 3B is an example of the visual saliency map outputted by the output unit 330. In the example of the present figure, the visual saliency is visualized at a luminance value of 256 levels. An example of the visual saliency map outputted by the output unit 330 will be described in detail later.

Figure 4:
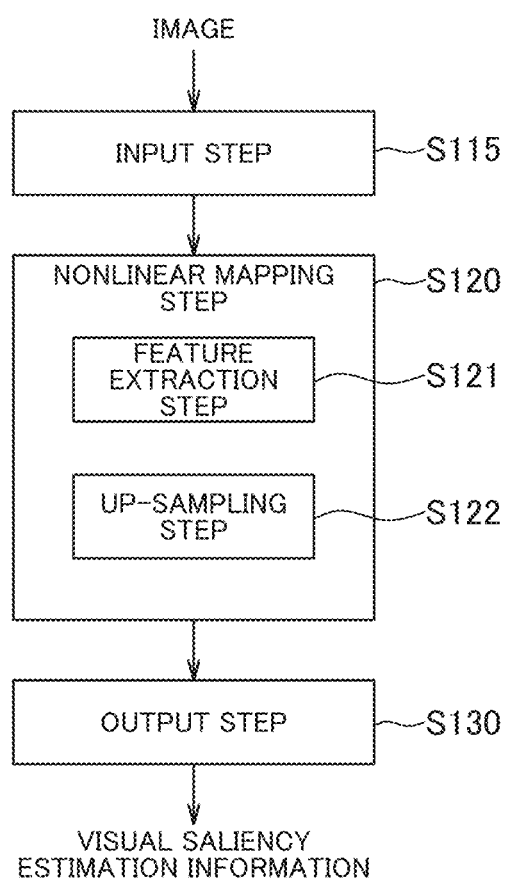
FIG. 4 is a flowchart which exemplifies a processing method of the visual saliency extraction means shown in FIG. 1.

FIG. 4 is a flowchart which exemplifies an operation of the visual saliency extraction means 3 according to the present example. The flowchart shown in FIG. 4 is a portion of a map data generating method executed by a computer and includes an input step S115, a nonlinear mapping step S120, and an output step S130. In the input step S115, an image is converted to mappable intermediate data. In the nonlinear mapping step S120, the intermediate data is converted to the mapping data. In the output step S130, the visual saliency estimation information which indicates the visual saliency distribution is generated based on the mapping data. Here, the nonlinear mapping step S120 includes a feature extraction step S121 which performs an extraction of a feature with respect to the intermediate data and an up-sampling step S122 which performs up-sampling of data generated in the feature extraction step S121.

Back in FIG. 2, each component of the visual saliency extraction means 3 is explained. The input unit 310 acquires an image and converts the image to the intermediate data in the input step S115. The input unit 310 acquires image data from the input means 2. Then, the input unit 310 converts the acquired image to the intermediate data. The intermediate data is not particularly limited as long as it is data which can be received by the nonlinear mapping unit 320 but is, for example, a high-dimensional tensor. Further, the intermediate data is, for example, data in which luminance is normalized with respect to an acquired image, or data in which each pixel of the acquired image is converted to gradient of the luminance. The input unit 310 may further perform denoising of the image or resolution conversion or the like in the input step S115.

The nonlinear mapping unit 320 acquires the intermediate data from the input unit 310 in the nonlinear mapping step S120. Then, the intermediate data is converted to the mapping data in the nonlinear mapping unit 320. Here, the mapping data is, for example, the high-dimensional tensor. A mapping processing performed to the intermediate data in the nonlinear mapping unit 320 is, for example, the mapping processing which can be controlled by a parameter or the like, and preferably a processing by a function, a functional, or a neural network.

Figure 5:
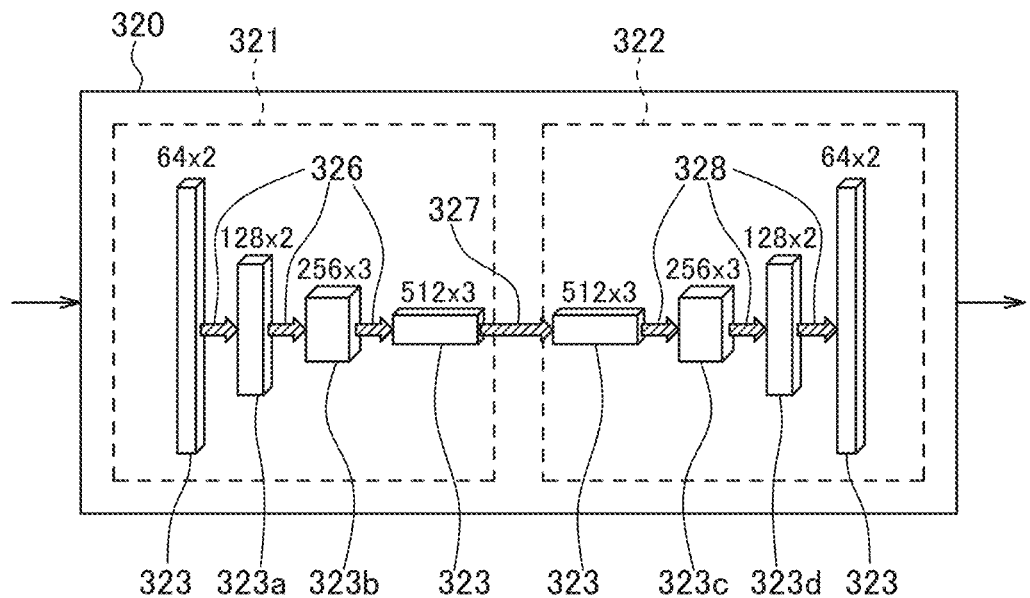
FIG. 5 is a diagram which exemplifies a configuration of a nonlinear mapping unit in detail.
Figure 6:
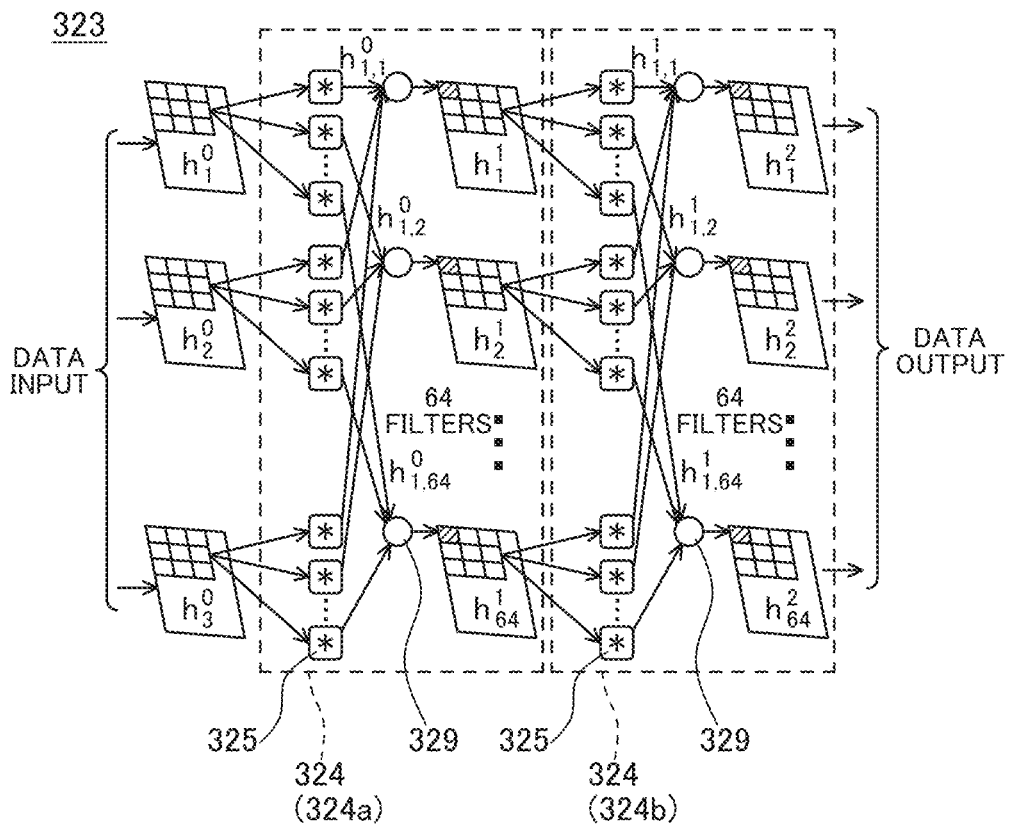
FIG. 6 is a diagram which exemplifies a configuration of an intermediate layer.

FIG. 5 is a diagram which exemplifies a configuration of the nonlinear mapping unit 320 in detail, and FIG. 6 is a diagram which exemplifies a configuration of an intermediate layer 323. As described above, the nonlinear mapping unit 320 includes the feature extraction unit 321 and the up-sampling unit 322. The feature extraction step S121 is performed in the feature extraction unit 321, and the up-sampling step S122 is performed in the up-sampling unit 322. Further, in the example of the present diagrams, at least one of the feature extraction unit 321 and the up-sampling unit 322 is configured including the neural network including a plurality of intermediate layers 323. In the neural network, the plurality of intermediate layers 323 are combined.

Particularly, the neural network is preferably a convolution neural network. Specifically, each of the plurality of intermediate layers 323 includes one or more convolution layers 324. Then, in the convolution layer 324, a convolution is performed by a plurality of filters 325 with respect to inputted data, and the activation processing is performed with respect to outputs of the plurality of filters 325.

In the example of FIG. 5, the feature extraction unit 321 is configured including the neural network including the plurality of intermediate layers 323, and includes a first pooling unit 326 between the plurality of intermediate layers 323. Further, the up-sampling unit 322 is configured including the neural network including the plurality of intermediate layers 323, and includes an unpooling unit 328 between the plurality of intermediate layers 323. Further, the feature extraction unit 321 and the up-sampling unit 322 are connected to each other via a second pooling unit 327 which performs overlap pooling.

Note that each intermediate layer 323 in the example of the present diagrams is formed of two or more convolution layers 324. However, at least a portion of intermediate layers 323 may be formed of only one convolution layer 324. Intermediate layers 323 which are adjacent to each other are divided by one or more of the first pooling unit 326, the second pooling unit 327, and the unpooling unit 328. Here, in a case where the two or more convolution layers 324 are included in the intermediate layers 323, respective numbers of the filters 325 in those convolution layers 324 are preferably the same as each other.

In the present diagram, "A×B" for the intermediate layers 323 means that each intermediate layer 323 is formed of B convolution layers and each convolution layer 324 includes A convolution filters for each channel. Such an intermediate layer 323 is also called "A×B intermediate layer" below. For example, a 64×2 intermediate layer 323 means that it is formed of two convolution layers 324, and that each of convolution layers 324 includes 64 convolution layers for each channel.

In the example of the present diagrams, the feature extraction unit 321 includes the 64×2 intermediate layer 323, a 128×2 intermediate layer 323, a 256×3 intermediate layer 323, and a 512×3 intermediate layer 323 in this order. Further, the up-sampling unit 322 includes a 512×3 intermediate layer 323, a 256×3 intermediate layer 323, a 128×2 intermediate layer 323, and a 64×2 intermediate layer 323 in this order. Further, the second pooling unit 327 connects two 512×3 intermediate layers 323 to each other. Note that a number of intermediate layers 323 which form the nonlinear mapping unit 320 is not particularly limited, and can be determined depending on, for example, a number of pixels of the image data.

Note that the present diagram shows an example of the configuration of the nonlinear mapping unit 320, and the nonlinear mapping unit 320 may include another configuration. For example, a 64×1 intermediate layer 323 may be included instead of the 64×2 intermediate layer 323. There is a possibility that a calculation cost is reduced by reducing a number of convolution layers 324 included in the intermediate layer 323. Further, for example, a 32×2 intermediate layer 323 may be included instead of the 64×2 intermediate layer 323. There is a possibility that the calculation cost is further reduced by reducing a number of channels of the intermediate layer 323. Further, both of the number of convolution layers 324 and the number of channels in the intermediate layer 323 may be reduced.

Here, in the plurality of intermediate layers 323 included in the feature extraction unit 321, it is preferable that the number of filters 325 increases every time passing the first pooling unit 326. Specifically, a first intermediate layer 323a and a second intermediate layer 323b are continuous to each other via the first pooling unit 326, and the second intermediate layer 323b is located at a later stage of the first intermediate layer 323a. Then, the first intermediate layer 323a is configured of the convolution layer 324 in which the number of filters 325 with respect to each channel is N1, and the second intermediate layer 323b is configured of the convolution layer 324 in which the number of filters 325 with respect to each channel is N2. In this case, N2>N1 is preferably established. Further, N2=N1×2 is more preferably established.

Further, in the plurality of intermediate layers 323 included in the up-sampling unit 322, it is preferable that the number of filters 325 decreases every time passing the unpooling unit 328. Specifically, a third intermediate layer 323c and a fourth intermediate layers 323d are continuous to each other via the unpooling unit 328, and the third intermediate layer 323c is located at a later step of the fourth intermediate layer 323d. Then, the third intermediate layer 323c is configured of the convolution layer 324 in which the number of filters 325 with respect to each channel is N3, and the fourth intermediate layer 323d is configured of the convolution layer 324 in which the number of filters 325 with respect to each channel is N4. At this time, N4<N3 is preferably established. Further, N3=N4×2 is more preferably established.

The feature extraction unit 321 extracts image features, such as a gradient or a shape, from the intermediate data acquired from the input unit 310 as channels of the intermediate layer 323, wherein the image features have a plurality of degrees of abstraction. FIG. 6 shows a configuration of a 64×2 intermediate layer 323 as an example. Processing on the intermediate layer 323 is explained with reference to the present diagram. In the example of the present diagram, the intermediate layer 323 is constituted of a first convolution layer 324a and a second convolution layer 324b, and each of convolution layers 324 includes 64 filters 325. In the first convolution layer 324a, a convolution processing using the filter 325 is performed with respect to each channel of data inputted to the intermediate layer 323. For example, in a case where an image inputted to the input unit 310 is a RGB image, the processing is performed with respect to each of three channels $h^0_i$ (i=1 . . . 3). Further, in the example of the present diagram, the filters 325 are 64 kinds of 3×3 filters, that is, 64×3 kinds of filters in total. As a result of the convolution processing, 64 results $h^0_{i,j}$ (I=1 . . . 3, j=1 . . . 64) are obtained with respect to each channel i.

Next, the activation processing is performed with respect to outputs of the plurality of filters 325 in an activation unit 329. Specifically, the activation processing is performed on a total sum for each element corresponding to results j which correspond to all channels. By this activation processing, results $h^1_i$ (i=1 . . . 64) of the 64 channels, that is, output of the first convolution layer 324a is obtained as the image feature. The activation processing is not particularly limited, however, it is preferable that the activation processing is a processing which uses at least any of a hyperbolic function, a sigmoid function, and a rectified linear function.

Further, output data of the first convolution layer 324a is set to be input data of the second convolution layer 324b, and the same processing as the first convolution layer 324a is performed on the second convolution layer 324b, and results $h^2_i$ (i=1 . . . 64) of the 64 channels, that is, output of the second convolution layer 324b is obtained as the image feature. The output of the second convolution layer 324b is output data of this 64×2 intermediate layer 323.

Here, a structure of the filter 325 is not particularly limited, however, the structure is preferably a two-dimensional filter of 3×3. Further, a coefficient of each filter 325 can be independently set. In the present example, the coefficient of each filter 325 is retained in a storage unit 390, and the nonlinear mapping unit 320 can read out and use the coefficient for the processing. Here, the coefficient of the plurality of filters 325 may be determined based on correction information which is generated and/or modified using machine learning. For example, the correction information includes the coefficient of the plurality of filters 325 as a plurality of correction parameters. The nonlinear mapping unit 320 can further use this correction information to convert the intermediate data to the mapping data. The storage unit 390 may be provided in the visual saliency extraction means 3 or may be provided in the outside of the visual saliency extraction means 3. Further, the nonlinear mapping unit 320 may acquire the correction information from the outside via a communication network.

Figure 7A:
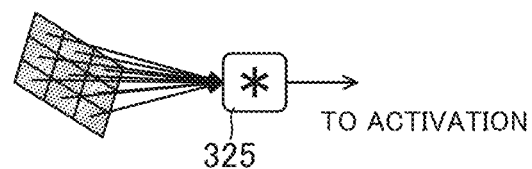
FIG. 7A is a diagram illustrating an example of convolution processing performed at a filter.
Figure 7B:
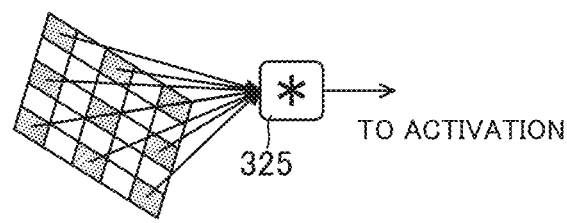
FIG. 7B is a diagram illustrating an example of convolution processing performed at a filter.

Each of FIGS. 7A and 7B is a diagram illustrating an example of the convolution processing performed at the filter 325. Examples of a 3×3 convolution are shown in both of FIGS. 7A and 7B. The example of FIG. 7A is the convolution processing using nearest elements. The example of FIG. 7B is the convolution processing using near elements having a distance which is equal to or greater than two. Note that the convolution processing which uses the near elements having a distance which is equal to or greater than three is also possible. It is preferable that the filter 325 performs the convolution processing using the near elements having the distance which is equal to or greater than two. This is because that a feature(s) in a wider range can be extracted and that estimation accuracy of the visual saliency can be further improved.

The operation of the 64×2 intermediate layer 323 was described above. Operations of other intermediate layers 323 (a 128×2 intermediate layer 323, a 256×3 intermediate layer 323, and a 512×3 intermediate layer 323 or the like) are the same as the operation of the 64×2 intermediate layer 323 except the number of convolution layers 324 and the number of channels. Further, an operation on the intermediate layer 323 in the feature extraction unit 321 and an operation on the intermediate layer 323 in the up-sampling unit 322 are the same as above.

Figure 8A:
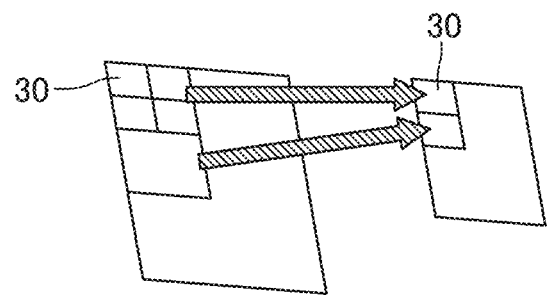
FIG. 8A is a diagram to explain processing of a first pooling unit.
Figure 8B:
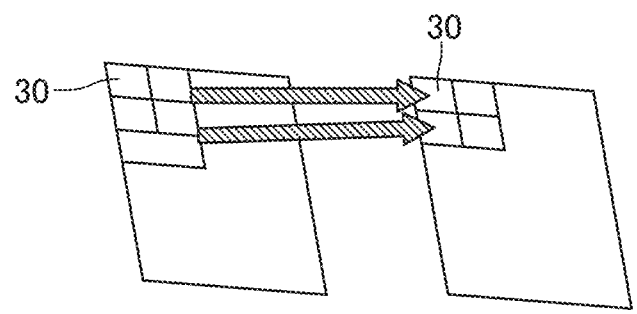
FIG. 8B is a diagram to explain processing of a second pooling unit.
Figure 8C:
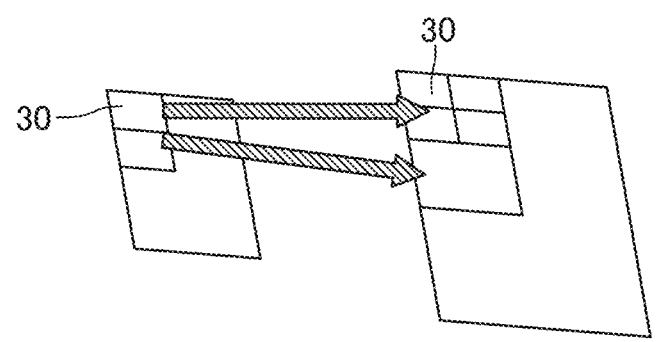
FIG. 8C is a diagram to explain processing of an unpooling unit.

FIG. 8A is a diagram to explain processing of the first pooling unit 326, FIG. 8B is a diagram to explain processing of the second pooling unit 327, and FIG. 8C is a diagram to explain processing of the unpooling unit 328.

In the feature extraction unit 321, pooling process is applied to data outputted from the intermediate layer 323 for each channel in the first pooling unit 326, which is then inputted to a next intermediate layer 323. In the first pooling unit 326, for example, non-overlapping pooling processing is performed. In FIG. 8A, processing which correlates four elements 30 of 2×2 with one element 30 with respect to an element group included in each channel is indicated. Such correlation is performed with respect to all of the elements 30 in the first pooling unit 326. Here, the four elements 30 of 2×2 are selected such that the four elements 30 do not overlap each other. In the present example, the number of each channel is reduced to one quarter. Note that as long as the number of elements is reduced in the first pooling unit 326, a number of elements 30 before and after the correlation is not particularly limited.

Data outputted from the feature extraction unit 321 is inputted to the up-sampling unit 322 via the second pooling unit 327. Overlap pooling is performed with respect to output data from the feature extraction unit 321 in the second pooling unit 327. In FIG. 8B, processing to correlate the four elements 30 of 2×2 with the one element 30 while causing a portion of elements 30 to overlap is indicated. That is, in repeated correlation, a portion of the four elements 30 of 2×2 in certain correlation is also included in the four elements 30 of 2×2 in next correlation. The number of elements is not reduced in the second pooling unit 327 shown in the present diagram. Note that the number of elements 30 before and after the correlation is not particularly limited in the second pooling unit 327.

A method of each processing performed in the first pooling unit 326 and the second pooling unit 327 is not particularly limited, however, the method is, for example, correlation of the maximum value of the four elements 30 with the one element 30 (max pooling), or correlation of an average value of the four elements 30 with the one element 30 (average pooling).

Data outputted from the second pooling unit 327 is inputted to the intermediate layer 323 in the up-sampling unit 322. Then, unpooling process is applied to outputted data from the intermediate layer 323 for each channel in the unpooling unit 328 in the up-sampling unit 322, which is then inputted to the next intermediate layer 323. Processing to enlarge the one element 30 to the plurality of elements 30 is shown in FIG. 8C. A method of enlargement is not particularly limited, however, an example of the method is a method to duplicate the one element 30 to four elements 30 of 2×2.

The output data of the last intermediate layer 323 of the up-sampling unit 322 is outputted from the nonlinear mapping unit 320 as the mapping data and inputted to the output unit 330. The output unit 330 in the output step S130 generates the visual saliency map and outputs the visual saliency map by performing, for example, normalization or resolution conversion or the like with respect to data acquired from the nonlinear mapping unit 320. The visual saliency map is, for example, an image (image data) in which the visual saliency is visualized with a luminance value as shown in FIG. 3B by way of example. Further, the visual saliency map may be, for example, an image which is color-coded according to the visual saliency as is the case with a heat map or may be an image in which marking is performed on a visual saliency region in which the visual saliency is higher than a predetermined reference, wherein the marking is performed so as to be distinguishable from other positions. Further, the visual saliency estimation information is not limited to the map information which is indicated as an image or the like and may be a table or the like in which information indicating the visual saliency region is enumerated.

Figure 9:
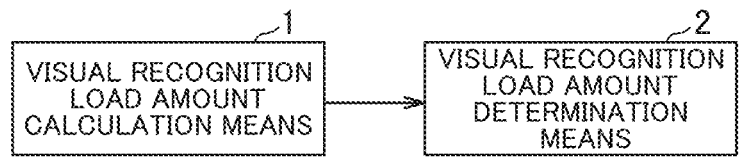
FIG. 9 is a functional configuration diagram of an analysis means shown in FIG. 1.

The analysis means 4 analyses, based on the visual saliency map outputted by the visual saliency extraction means 3, whether visual recognition load in a point corresponding to the visual saliency map tends to be high. The analysis means 4 includes, as shown in FIG. 9, a visual recognition load amount calculation means 41 and a visual recognition load determination means 42.

The visual recognition load amount calculation means 41 calculates a visual recognition load amount based on the visual saliency map outputted by the visual saliency extraction means 3. The visual recognition load amount which is a result of calculation by the visual recognition load amount calculation means 41 may be, for example, a scalar amount or a vector amount. Further, the visual recognition load amount may be single data or a plurality of time sequence data. The visual recognition load amount calculation means 41 estimates gazing point information and calculates a gazing point movement amount as the visual recognition load amount.

Details of the visual recognition load amount calculation means 41 is explained. First, the gazing point information is estimated from the time-sequential visual saliency map outputted by the visual saliency extraction means 3. A definition of the gazing point movement amount is not particularly limited, however, may be e.g. a position (coordinate) at which a value of visual saliency becomes the maximum. That is, the visual recognition load amount calculation means 41 estimates that the gazing point information is a position on an image in which the visual saliency becomes the maximum in the visual saliency map (visual saliency distribution information).

Then, the gazing point movement amount of the time sequence is calculated from the gazing point information of an estimated time sequence. The calculated gazing point movement amount also becomes the time sequence data. A calculation method is not particularly limited, however, may be, for example, a method to calculate a Euclidean distance or the like between gazing point coordinates which are preceding and subsequent in the time sequence. That is, in the present example, the gazing point movement amount is calculated as the visual recognition load amount. That is, the visual recognition load amount calculation means 41 functions as a movement amount calculation unit which calculates a movement amount of a gazing point (estimated gazing point) based on the generated visual saliency map (visual saliency distribution information).

The visual recognition load determination means 42 determines whether or not the visual recognition load of a point or a section of a target is large, wherein the determination is performed based on the movement amount calculated by the visual recognition load amount calculation means 41.

A determination method in the visual recognition load determination means 42 will be described later.

An addition means 5 adds attention point information to acquired map data based on an analysis result in the analysis means 4. That is, the addition means 5 adds the point which is determined that the visual recognition load thereof is large by the visual recognition load determination means 42, to the map data as a point which requires an attention.

Figure 10:
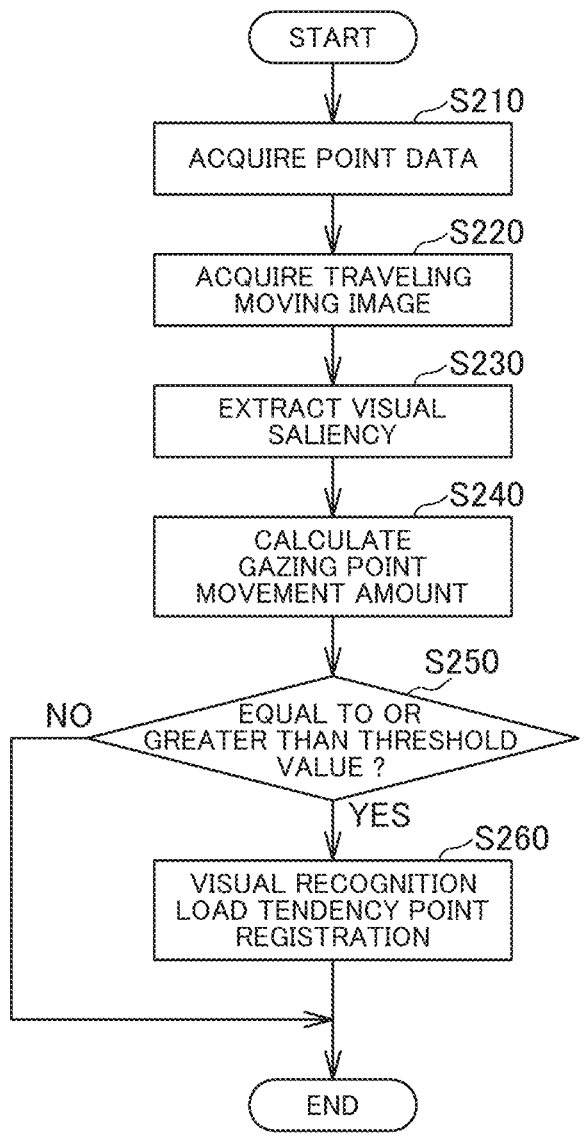
FIG. 10 is a flowchart of an operation of the map data generation device shown in FIG. 1.

Next, an operation in the map data generation device 1 of the configuration mentioned above (map data generation method) is explained with reference to the flowchart of FIG. 10. Further, by configuring this flowchart as a program executed by a computer which functions as the map data generation device 1, the flowchart may be the map data generating program. Further, this map data generating program may not be limited to be stored in a memory or the like included in the map data generation device 1, but may be stored in a storage medium such as a memory card or an optical disc or the like.

First, the input means 2 acquires a point data (step S210). The point data may be acquired from the GPS receiver or the like as described above.

Next, the input means 2 acquires a traveling moving image (image data) (step S220). In the present step, the image data inputted to the input means 2 is decomposed to the time sequence such as an image frame or the like, associated with the point data acquired in the step S210, and inputted to the visual saliency extraction means 3. Further, image processing such as the denoising or a geometric conversion or the like may be performed in the present step. Note that an order of the step S210 and the step S220 may be reversed.

Then, the visual saliency extraction means 3 extracts the visual saliency map (step S230). The visual saliency map outputs the visual saliency map shown in FIG. 3B in a time sequence in the visual saliency extraction means 3 by the method described above.

Next, the visual recognition load amount calculation means 41 calculates the gazing point movement amount by the method described above (step S240).

Next, the visual recognition load determination means 42 determines whether or not the gazing point movement amount calculated in the step S240 is equal to or greater than a predetermined threshold value (step S250). This threshold value is a threshold value regarding the gazing point movement amount. That is, the visual recognition load determination means 42 functions as the first determination unit which compares a calculated movement amount of the gazing point with a first threshold value to determine whether or not there is the tendency that the visual recognition load is high in the point or the section indicated by the point data (position information) corresponding to the visual saliency map (visual saliency distribution information). In a case where the gazing point movement amount is equal to or greater than the predetermined threshold value as a result of a determination in the step S250 (step S250: Yes), the addition means 5 registers (adds) the target point to the map data as an attention point in which the visual recognition load amount is large (step S260).

In a case where the gazing point movement amount is less than the predetermined threshold value as the result of the determination in the step S250 (step S250: No), the visual recognition load amount of the target point is not large, therefore not registering the target point as the attention point.

Figure 11:
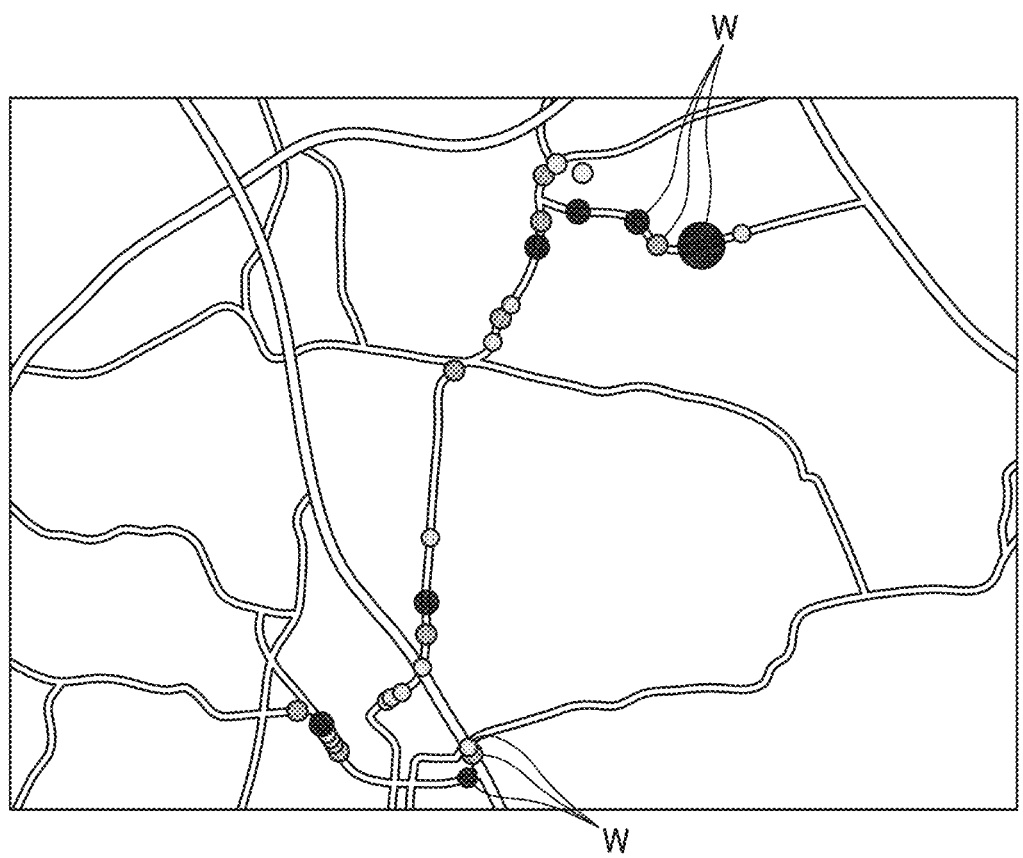
FIG. 11 is an example of map data generated by the map data generation device shown in FIG. 1.

Here, an example of a map in which the attention point is registered is shown in FIG. 11. A circular mark which is indicated with a sign W in FIG. 11 indicates the attention point. FIG. 11 is an example showing a point at which the visual recognition load amount is large. Here, a color or a depth of the color of the circular mark may be changed or a size of the circular mark may be changed depending on a the visual recognition load amount.

According to the present example, the map data generation device 1 acquires image data in which the outside is captured from a vehicle by the input means 2 and the point data of the vehicle, associates both data, and generates the visual saliency map acquired by estimating a level of the visual saliency based on the image data by the visual saliency extraction means 3. Then, the map data generation device 1 analyzes, by the analysis means 4 and based on the visual saliency map, whether or not the visual recognition load tends to be high at the point or the section indicated by the position information corresponding to the visual saliency map, and adds, by the addition means 5 and based on an analysis result of the analysis means 4, the point or the section which indicates a tendency that the visual recognition load is high, to the map data. Thus, the visual saliency is estimated based on the image in which the outside is captured from the vehicle, and it is possible to add the point at which stress is visually felt, to the map data based on the estimated feature.

Further, the analysis means 4 includes: the visual recognition load amount calculation means 41 which calculates the gazing point movement amount based on the visual saliency map; and the visual recognition load determination means 42 which determines whether or not the visual recognition load tends to be high at the point or the section indicated by the point data corresponding to the visual saliency map, wherein the determination is performed by comparing the calculated gazing point movement amount with the first threshold value. Thus, by comparing the gazing point movement amount with the first threshold value, it can be determined easily whether or not there is the tendency that the visual recognition load is high.

Further, the visual recognition load amount calculation means 41 calculates the movement amount by estimating that the gazing point is the position on the image in which the visual saliency becomes the maximum in the visual saliency map. Thus, it is possible to calculate the movement amount based on the position which is estimated to be visually recognized the most.

Further, the visual saliency extraction means 3 includes; the input unit 310 which converts the image to the mappable intermediate data; the nonlinear mapping unit 320 which converts the intermediate data to the mapping data; and the output unit 330 which generates the saliency estimation information indicating the saliency distribution based on the mapping data, and the nonlinear mapping unit 320 includes: the feature extraction unit 321 which performs the extraction of a feature with respect to the intermediate data; and the up-sampling unit 322 which performs the up-sampling of the data generated by the feature extraction unit 321. Thus, the visual saliency can be estimated with a small calculation cost.

Example 2

Next, a map data generation device according to a second example of the present invention is explained with reference to FIGS. 12-15. Note that the same reference signs are allocated to the same portions as the above-mentioned first example and explanation thereof will be omitted.

In the present example, a visual attention concentration degree, not the visual recognition load explained in the first example, is calculated, and a point or the like which requires visual attention is added to map data based on the visual attention concentration degree. An explanation will be given on the visual attention concentration degree later.

Figure 12:
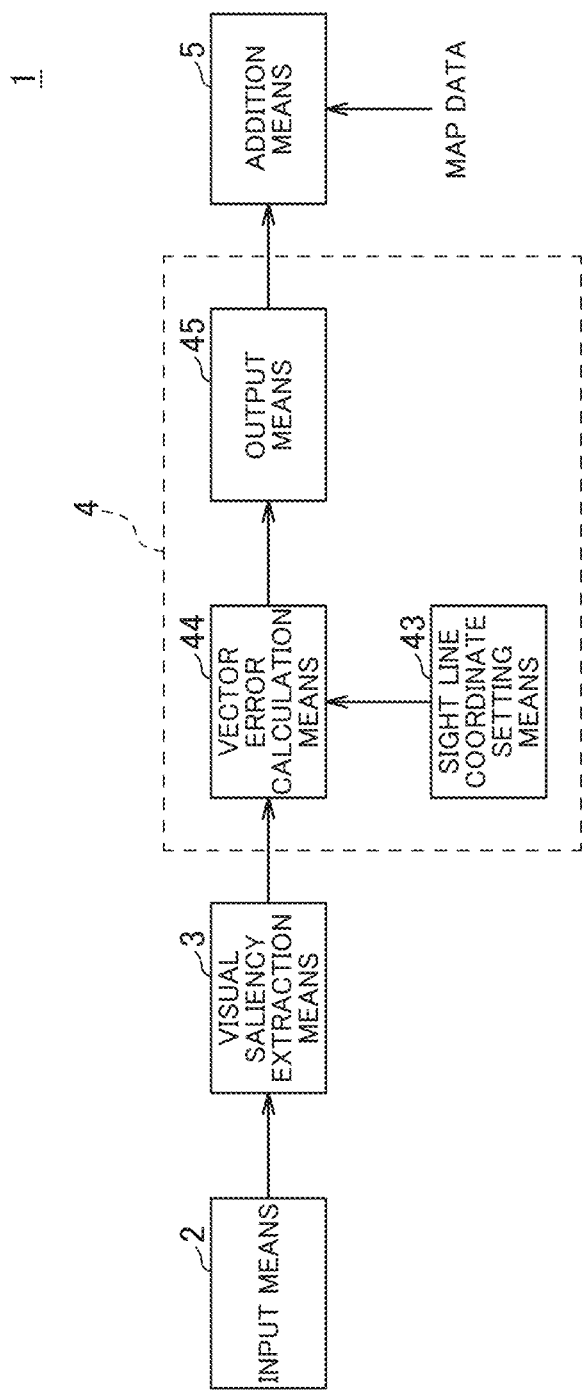
FIG. 12 is a functional configuration diagram of the map data generation device according to the second example of the present invention.

As shown in FIG. 12, an analysis means 4 according to the present example includes a sight line coordinate setting means 43, a vector error calculation means 44, and an output means 45.

The sight line coordinate setting means 43 sets a later-described ideal sight line on a visual saliency map. The ideal sight line means a sight line which a driver of an automobile directs along a traveling direction in an ideal traffic environment in which there is no obstacle or traffic participant other than the driver him/herself. The ideal sight line is treated as (x, y) coordinates on image data or the visual saliency map. Note that in the present example, the ideal sight line has fixed values, however, the ideal sight line may be treated as a function of velocity or a friction coefficient of a road which influences a stopping distance of a mobile object, or may be determined using preset route information. That is, the sight line coordinate setting means 43 functions as a sight line position setting unit which sets the ideal sight line (reference sight line position) on the image in accordance with a predetermined rule.

The vector error calculation means 44 calculates a vector error based on the visual saliency map outputted by a visual saliency extraction means 3 and the ideal sight line set by the sight line coordinate setting means 43 with respect to the image and/or the visual saliency map, and calculates a later described visual attention concentration degree Ps which indicates a concentration degree of visual attention based on the vector error. That is, the vector error calculation means 44 functions as visual attention concentration degree calculation unit which calculates the concentration degree of the visual attention in the image based on visual saliency distribution information and a sight line position.

Figure 13:
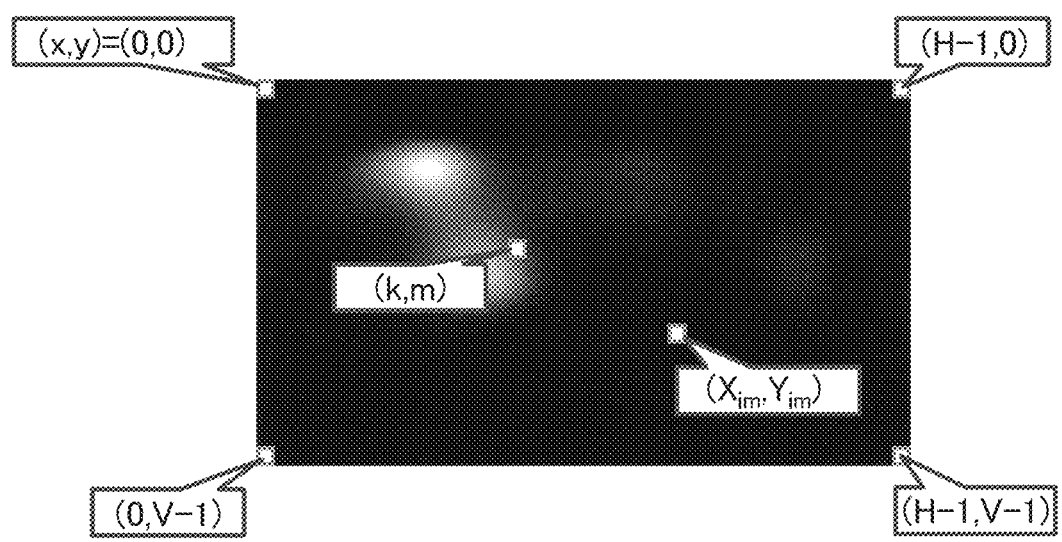
FIG. 13 is an explanatory drawing of a vector error.

Here, the vector error in the present example will be explained with reference to FIG. 13. FIG. 13 illustrates an example of the visual saliency map. This visual saliency map is indicated by a luminance value of 256 levels of H pixels×V pixels, and a pixel having higher visual saliency is displayed with higher luminance as is the case with FIG. 3B. In FIG. 13, when coordinates (x, y)=($x_{im}$, $y_{im}$) of the ideal sight line are established, the vector error between the coordinates (x, y) and a pixel of arbitrary coordinates (k, m) in the visual saliency map is calculated. In a case where coordinates having high luminance and coordinates of the ideal sight line are separated far from each other in the visual saliency map, it means that a position to be gazed at and a position which is actually easily gazed at are separated far from each other, and it can be said that the image is an image at which the visual attention easily becomes distracted. On the other hand, in a case where the coordinates having high luminance and the coordinates of the ideal sight line are close, it means that the position to be gazed at and the position which is actually easily gazed at are close, and it can be said that the image is an image in which the visual attention is easily concentrated at the position to be gazed at.

Next, a calculation method of the visual attention concentration degree Ps in the vector error calculation means 44 is explained. In the present example, the visual attention concentration degree Ps is calculated by a following formula (1) below.

[Formula 1]

$$P_S = \frac{\alpha}{\sum_{m=0}^{V-1} \sum_{k=0}^{H-1} V_{VC(k,m)} f_w(d_{err(k,m)})} \quad (1)$$

In the formula (1), $V_{vc}$ indicates a pixel depth (luminance value), $f_w$ indicates a weighting function, and den indicates the vector error. This weighting function is a function having a weight which is set based on, for example, a distance from a pixel indicating a value of $V_{vc}$ to the coordinates of the ideal sight line. $\alpha$ is a coefficient such that the visual attention concentration degree Ps becomes 1 on the visual saliency map (reference heat map) of one bright point at time when coordinates of the bright point and coordinates of the ideal sight line match.

That is, the vector error calculation means 44 (visual attention concentration degree calculation unit) calculates the concentration degree of visual attention based on a value of each pixel constituting the visual saliency map (visual saliency distribution information) and the vector error between a position of each pixel and a coordinate position of the ideal sight line (reference sight line position).

The visual attention concentration degree Ps obtained as described above is a reciprocal of a sum of a weighted relation between the vector error of coordinates of all pixels from the coordinates of the ideal sight line set on the visual saliency map and the luminance value. As this visual attention concentration degree Ps, a low value is calculated when a distribution of the visual saliency map in which luminance is high is separated far from the coordinates of the ideal sight line. That is, the visual attention concentration degree Ps may be described as a concentration degree with respect to the ideal sight line.

Figure 14A:
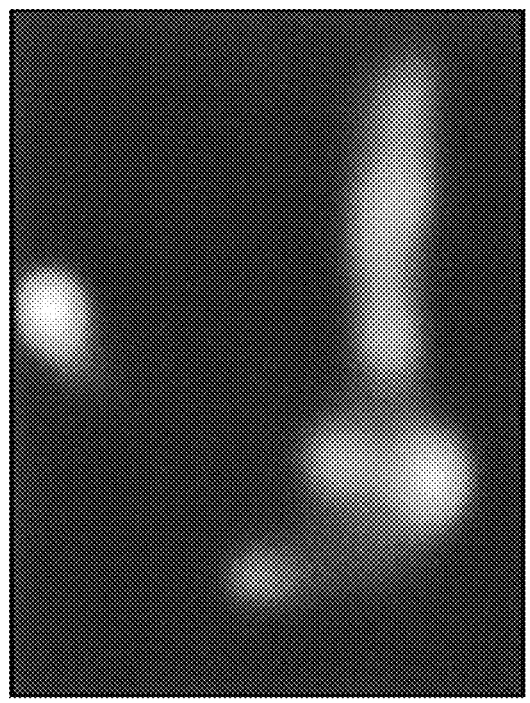
FIG. 14A is an example of an image inputted to the input means shown in FIG. 1.
Figure 14B:
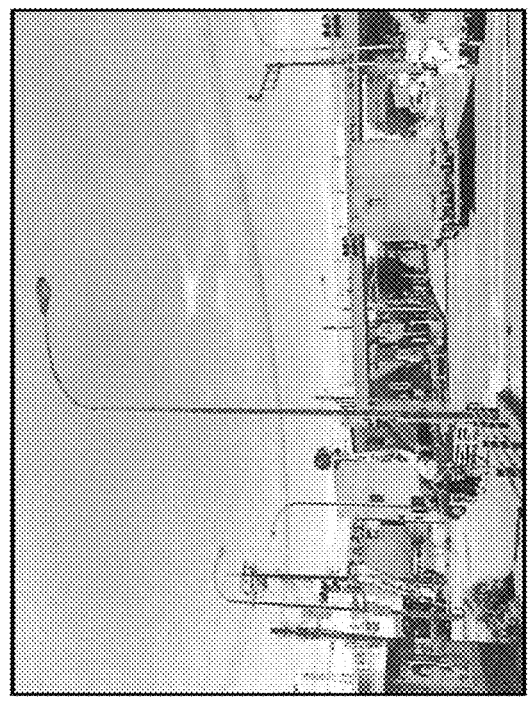
FIG. 14B is an example of a visual saliency map acquired from the image.

Examples of an image inputted to the input means 2 and the visual saliency map acquired from the image are shown in FIG. 14. FIG. 14A is the inputted image and FIG. 14B is the visual saliency map. In such FIGS. 14A-14B, in a case where the coordinates of the ideal sight line are set, for example, on a road such as on a truck or the like travelling in front, the visual attention concentration degree Ps in the case is calculated.

The output means 45 outputs information regarding risk on a scene indicated by the image in which the visual attention concentration degree Ps is calculated, based on the visual attention concentration degree Ps calculated by the vector error calculation means 44. As the information regarding the risk, for example, a predetermined threshold value is set for the visual attention concentration degree Ps, and information that the scene has a high risk is outputted if the calculated visual attention concentration degree Ps is equal to or less than the threshold value. For example, it may be configured such that in a case where the visual attention concentration degree Ps calculated in FIG. 10 is equal to or less than the threshold value, the scene is determined to include high risk and information is outputted that there is risk in the scene (or scene is highly risky).

Figure 15:
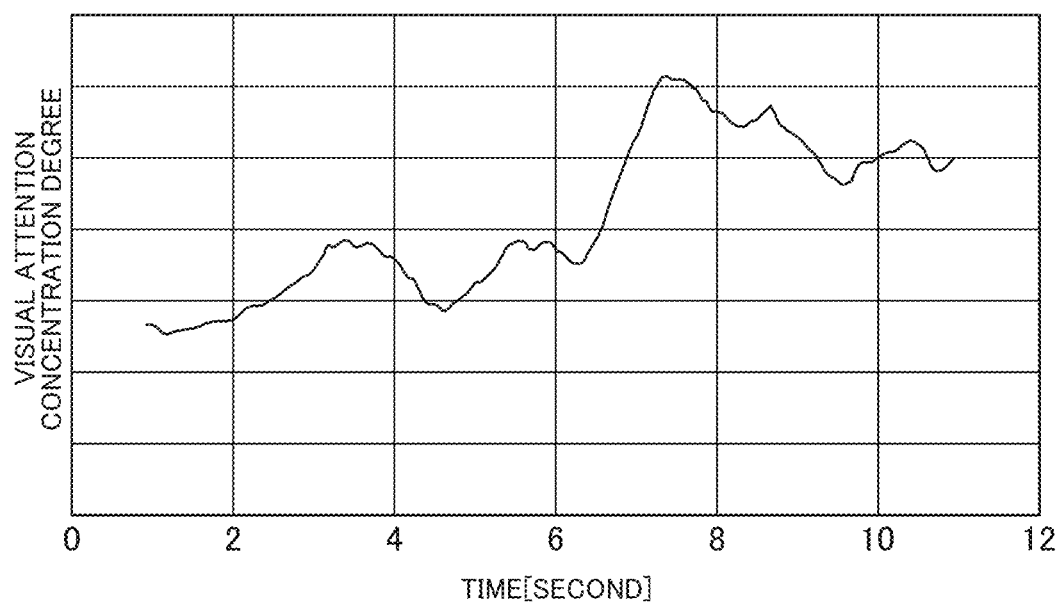
FIG. 15 is a graph showing an example of a temporal change of a visual attention concentration degree.

Further, the output means 45 may output the information regarding the risk based on a temporal change of the visual attention concentration degree Ps calculated by the vector error calculation means 44. An example of the temporal change of the visual attention concentration degree Ps is indicated in FIG. 15. FIG. 15 indicates a change of the visual attention concentration degree Ps in a moving image with a 12 second duration. In FIG. 15, the visual attention concentration degree Ps rapidly changes during a period of approximately 6.5 seconds to 7 seconds. This is a case where, for example, another vehicle cuts in front of an own vehicle or the like.

As shown in FIG. 15, the information indicating that there is risk in the scene (or scene is highly risky) may be outputted by determining that the scene includes high risk by comparing a change rate or a change value per short unit time of the visual attention concentration degree Ps with the predetermined threshold value. Further, presence or absence (level) of risk may be determined by, for example, a pattern of the change, such as increase of the visual attention concentration degree Ps which once went down or the like.

Then, in the present example, in a case where information that there is risk is included in the information regarding risk outputted from the output means 45, the addition means 5 registers (adds) a point or a section indicated by the processed image to the map data as an attention point (point requiring attention). Note that an example of a map in the present example is the same as FIG. 11.

According to the present example, the sight line coordinate setting means 43 sets the coordinates of the ideal sight line on a predetermined fixed position. Then, the vector error calculation means 44 calculates the visual attention concentration degree Ps in the image based on the visual saliency map and the ideal sight line. Thus, since the visual saliency map is used, a contextual attention state as to what an object such as a signage or a pedestrian included in the image is can be reflected. Therefore, it becomes possible to accurately calculate the visual attention concentration degree Ps. Then, a risk point can be added to the map data based on the visual attention concentration degree Ps calculated in the above-described manner.

Further, the vector error calculation means 44 calculates the visual attention concentration degree Ps based on the value of each pixel constituting the visual saliency map and the vector error between the position of each pixel and the coordinate position of the ideal sight line. Thus, a value corresponding to a difference between a position in which the visual saliency is high and the ideal sight line is calculated as the visual attention concentration degree Ps. Therefore, it is possible to cause a value of the visual attention concentration degree Ps to change depending on, for example, a distance between the position in which the visual saliency is high and the ideal sight line.

Further, the vector error calculation means 44 includes the output means 45 which outputs risk information at the point indicated by the image based on the temporal change of the visual attention concentration degree Ps. Thus, it becomes possible to output e.g. a point at which the temporal change of the visual attention concentration degree Ps is large as an accident risk point or the like.

Example 3

Next, a map data generation device according to a third example of the present invention is explained with reference to FIGS. 16-20. Note that the same reference signs are allocated to the same portions as the above-mentioned first and second examples and explanation thereof will be omitted.

The present example is a modification example of the second example and calculation of the visual attention concentration degree is performed therein as is the case with the second example. An image inputted from the input means 2 in the present example is different from the image in the second example in that the image in the present example is an image of entering into an intersection and in a determination method of risk in the output means 45 or the like.

Figure 16:
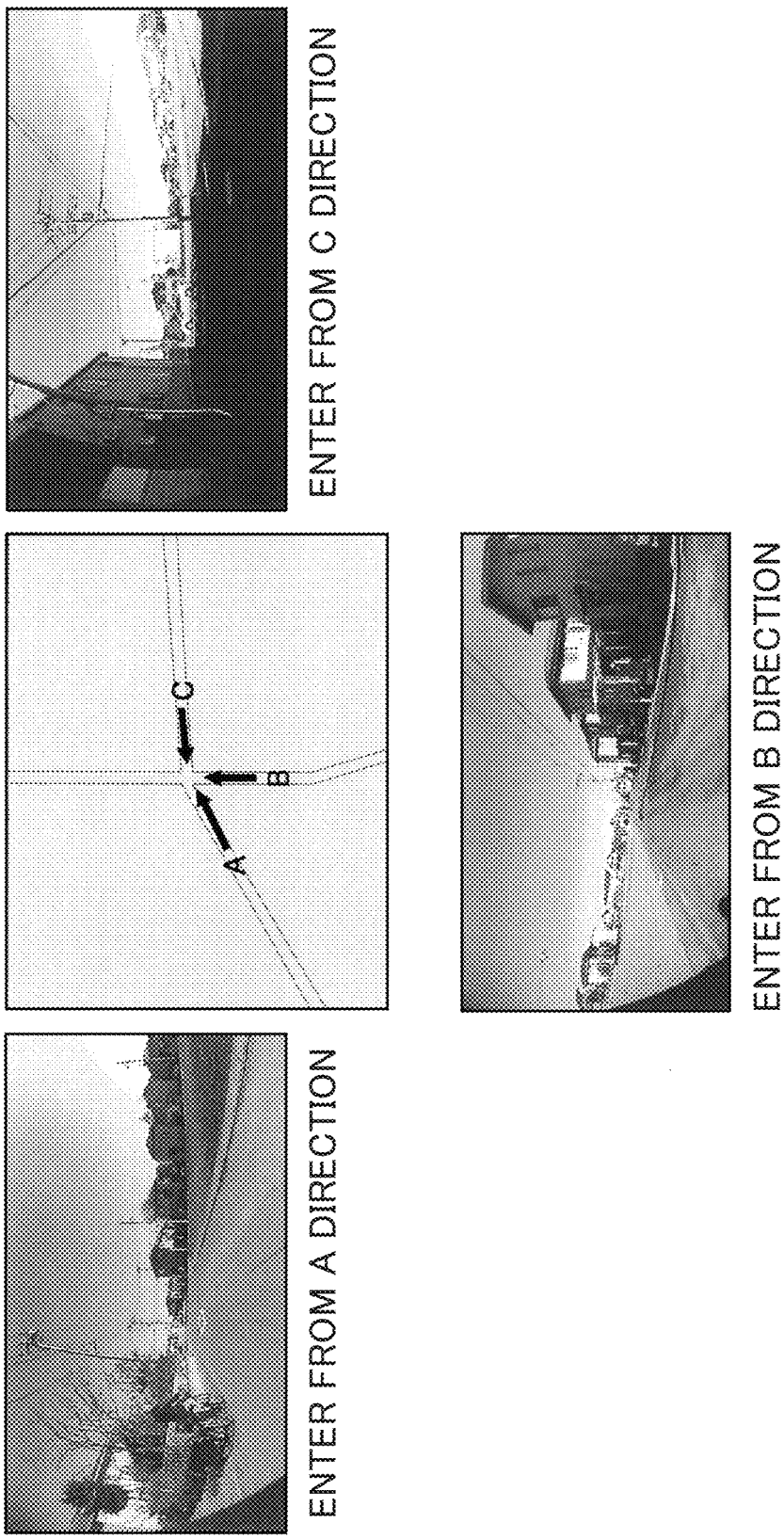
FIG. 16 is a group of drawings illustrating examples of an intersection to which the map data generation device is applied according to a third example of the present invention.

An example of an intersection to be a target to which risk information is outputted in the present example is shown in FIG. 16. FIG. 16 illustrates an intersection which constitutes a junction of four roads (crossroads). Respective images in FIG. 16 show images of an intersection direction (traveling direction) when respectively entering from an A direction, a B direction, and a C direction to this intersection. That is, the images shown in FIG. 16 are images of cases where the A direction, the B direction, and the C direction are approach paths which are roads to enter into the intersection respectively.

Figure 17:
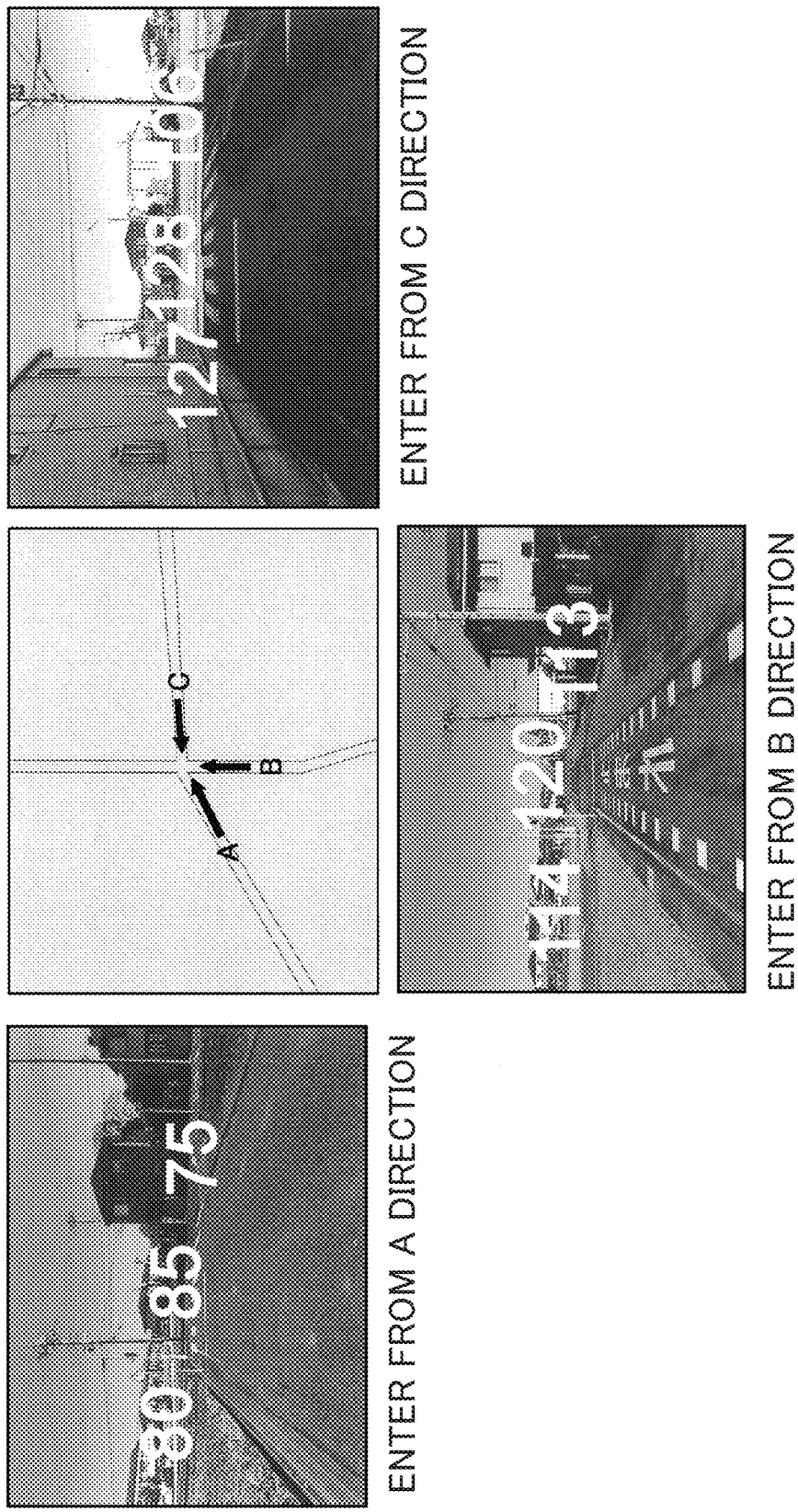
FIG. 17 shows calculation of the visual attention concentration degree by setting an ideal sight line regarding the intersection shown in FIG. 16.

Visual saliency maps are acquired respectively with respect to the images shown in FIG. 16 as described in the former example. Then, regarding the images, an ideal sight line is set with respect to each of traveling directions of traveling straight, turning right, and turning left, and visual attention concentration degree Ps is calculated with respect to each of the ideal sight lines (FIG. 17). That is, the ideal sight line (reference sight line position) in the image is respectively set for each exit path which is a road to get out after entering into the intersection, and a vector error calculation means 44 calculates the visual attention concentration degree Ps with respect to each ideal sight line.

Figure 18A:
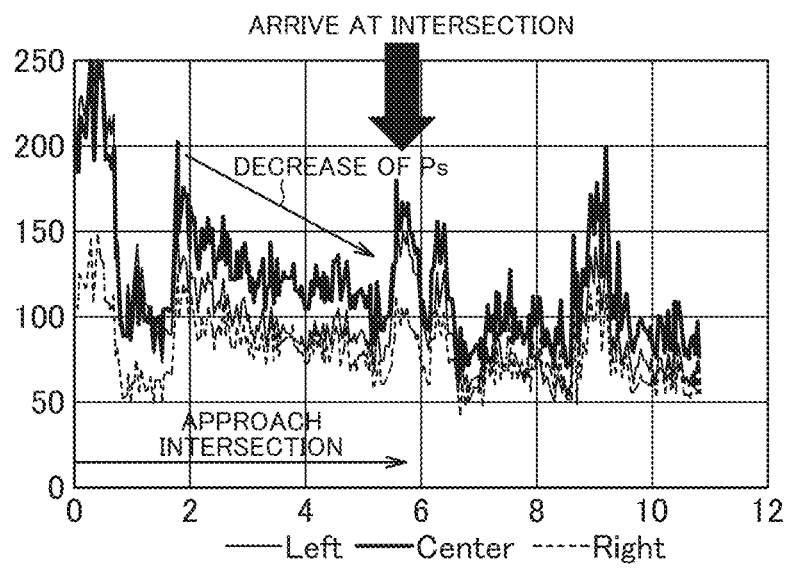
FIG. 18A is a graph indicating a temporal change of the visual attention concentration degree shown in FIG. 17.
Figure 18B:
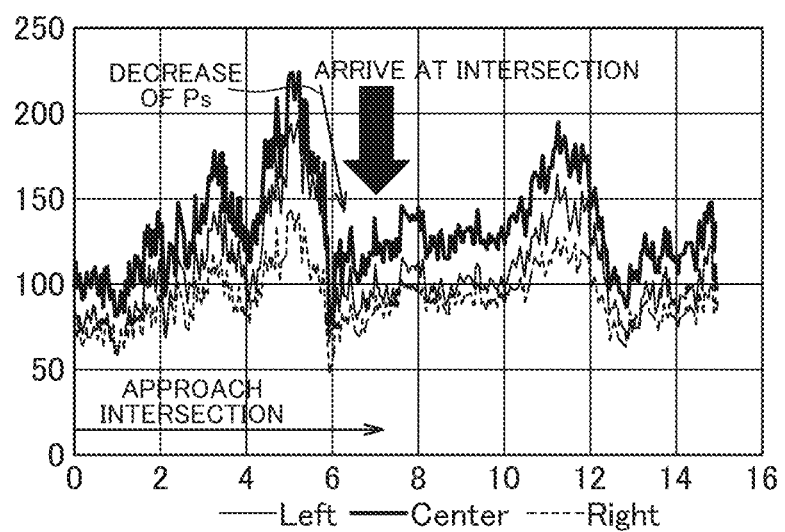
FIG. 18B is a graph indicating a temporal change of the visual attention concentration degree shown in FIG. 17.
Figure 18C:
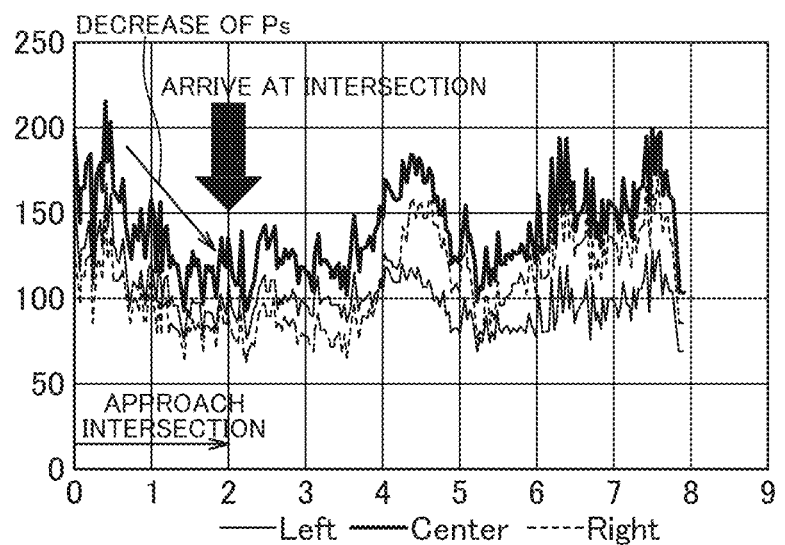
FIG. 18C is a graph indicating a temporal change of the visual attention concentration degree shown in FIG. 17.

Here, the temporal change of the visual attention concentration degree Ps when entering into the intersection from each approach path is shown in FIG. 18. Such a temporal change is based on a calculation result of the vector error calculation means 44. In graphs of FIGS. 18A-18C, a vertical axis indicates the visual attention concentration degree Ps and a horizontal axis indicates time, and the FIGS. 18A-18C respectively show a case where the ideal sight line is set in respective directions of a thick line indicating traveling straight, a thin line indicating turning left, and a broken line indicating turning right. Then, FIG. 18A shows a case of entering from the A direction, FIG. 18B shows a case of entering from the B direction, and FIG. 18C shows a case of entering from the C direction respectively.

According to FIGS. 18A-18C, when approaching the intersection, the visual attention concentration degree Ps tends to decrease, however, there is also a case where the visual attention concentration degree Ps rapidly decreases immediately before the intersection as shown in FIG. 18B. Further, according to FIGS. 18A-18C, the visual attention concentration degree Ps when assuming that the sight line is directed to left or right for turning right or turning left tends to be lower than the visual attention concentration degree Ps when assuming that a driver looks straight in front to travel straight.

Figure 19A:
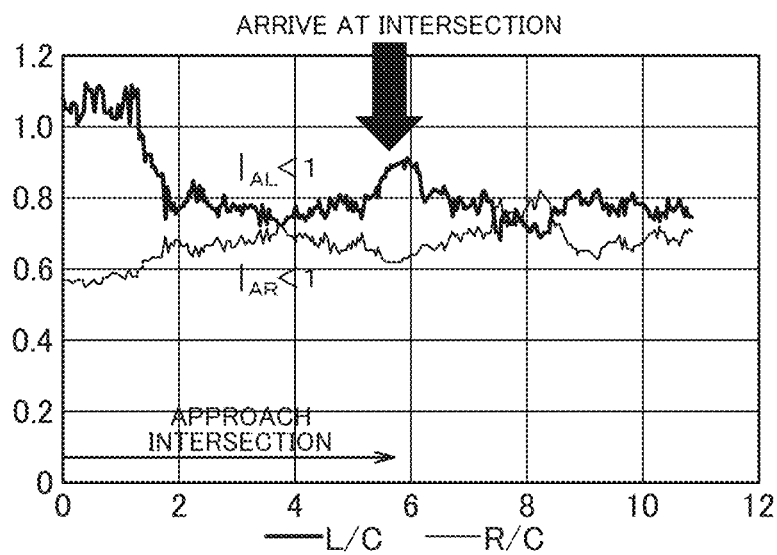
FIG. 19A is a graph of a result of a calculation of ratio of the visual attention concentration degree shown in FIG. 18 when turning right or left to the visual attention concentration degree when traveling straight.
Figure 19B:
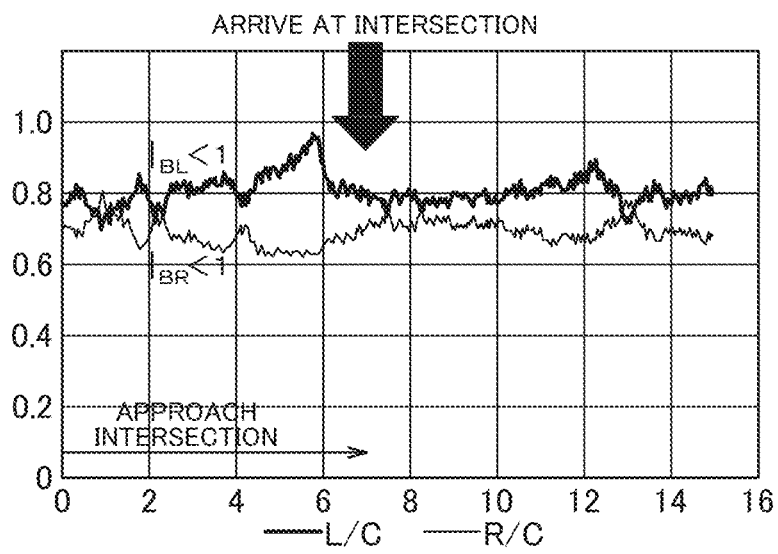
FIG. 19B is a graph of a result of calculation of ratio of the visual attention concentration degree shown in FIG. 18 when turning right or left to the visual attention concentration degree when traveling straight.
Figure 19C:
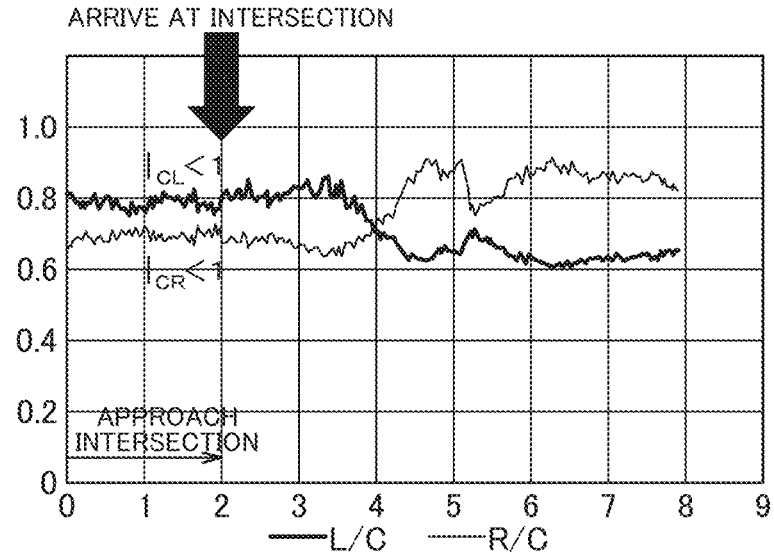
FIG. 19C is a graph of a result of calculation of ratio of the visual attention concentration degree shown in FIG. 18 when turning right or left to the visual attention concentration degree when traveling straight.

Next, a ratio of the visual attention concentration degree Ps in a right direction or a left direction to the visual attention concentration degree Ps in a straight direction is calculated by the output means 45 by using the temporal change of the visual attention concentration degree Ps calculated in FIGS. 18A-18C. A change of the calculated ratio is shown in FIGS. 19A-19C. In graphs of FIGS. 19A-19C, a vertical axis indicates the ratio, a horizontal axis indicates time, a thick line indicates a ratio of turning left/traveling straightforward (L/C), and a thin line indicates a ratio of turning right/traveling straightforward (R/C). Then, FIG. 19A shows a case of entering from the A direction, FIG. 19B shows a case of entering from the B direction, and FIG. 19C shows a case of entering from the C direction respectively. For example, in FIG. 19A, $I_{AL}$ indicates $PS_{LA}$ (visual attention concentration degree in left in A direction)/$PS_{CA}$ (visual attention concentration degree in constant traveling in A direction) and $I_{AR}$ indicates $PS_{RA}$ (visual attention concentration degree in right in A direction)/$PS_{CA}$ (visual attention concentration degree in straightforward traveling in A direction). $I_{BL}$ and $I_{BR}$ of FIG. 19B and $I_{CL}$ and $I_{CR}$ of FIG. 19C mean the same as $I_{AL}$ and $I_{AR}$ in FIG. 19A except that the respective entering directions are different.

According to FIGS. 19A-19C, when a ratio of visual attention concentration degree such as $I_{AL}$ and $I_{AR}$ is less than 1, it can be said that the ratio indicates an intersection at which a concentration degree of a driver (=the visual attention concentration degree Ps) decreases more when directing a sight line for turning right or left than directing a sight line to travel straightforward. On the contrary, when the ratio is greater than 1, it can be said that the ratio indicates an intersection at which the concentration degree of the driver decreases when carrying the sight line to travel straightforward.

Therefore, in the output means 45, a state of risk at the target intersection can be determined based on the temporal change of the visual attention concentration degree Ps described above or the ratio of the visual attention concentration degree Ps to output a determination result as information regarding the risk. Then, it is possible to add an attention point to the map data based on the information regarding the risk.

According to the present example, the sight line coordinate setting means 43 respectively sets coordinates of the ideal sight line in the image for each exit path with respect to the visual saliency map, wherein the exit path is a road to get out after entering the intersection. Then, the visual attention concentration degree Ps is calculated by the vector error calculation means 44 based on the visual saliency map and the ideal sight line, and the output means 45 outputs the risk information at the intersection based on the visual attention concentration degree Ps calculated for each exit path. Thus, the risk information is outputted by evaluating the risk with respect to the target intersection, and the risk information can be added to the map data.

Further, the output means 45 outputs the risk information based on a ratio of the visual attention concentration degree Ps of an exit path for travelling straight out of the exit paths to the visual attention concentration degree Ps of an exit path for turning right or turning left. Thus, it is possible to output an evaluation result by evaluating which direction an attention is more easily oriented to when traveling straight and turning right or left.

Further, the output means 45 may output the risk information based on the temporal change of the visual attention concentration degree Ps. Thus, it is possible to output the risk information by detecting a case where, for example, the visual attention concentration degree Ps rapidly changes or the like.

Note that in the third example, for example in FIG. 17, in a case of entering into the intersection from the A direction, the visual attention concentration degree Ps of turning right (traveling toward B direction) decreases. In a case of entering into the intersection from the B direction, the visual attention concentration degree Ps of turning right or left (traveling toward A direction or C direction) decreases. In a case of entering into the intersection from the C direction, the visual attention concentration degree Ps of turning right decreases.

In this case, for example, both of a route of turning right from the A direction and a route of turning left from the B direction are routes on which the visual attention concentration degree Ps decreases more than that of other routes, and in addition, when the approach path and the exit path are exchanged, the route of turning right from the A direction and the route of turning left from the B direction become the same route. Thus, at this intersection, the information regarding risk such that this route has risk (or high risk) may be outputted.

Further, in the third example, the explanation is made regarding the intersection, however, this concept may also be applied to a curve on a road. An explanation will be made with reference to FIG. 20.

Figure 20:
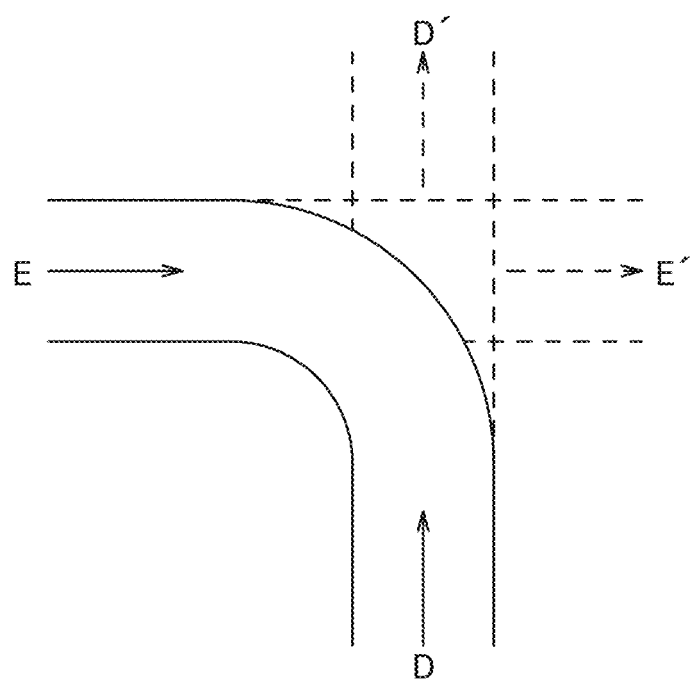
FIG. 20 is an example of a curve to which a modification example of the third example is applied.

FIG. 20 is an example of a curved road. Regarding this road, there are a case of traveling from a D direction (lower side in drawing) as turning a left curve, and a case of traveling from a E direction (left side in drawing) as turning a right curve. Here, in a case of entering into the curve from the D direction for example, the ideal sight line is set not only in the left direction which is a bending direction of the road but also in a direction (D' direction) in a case of assuming that the road stretches straight, and the visual attention concentration degrees Ps of each of the cases is calculated. As is the case with the above, in a case of entering into the curve from the E direction, the ideal sight line is set not only in the right direction which is the bending direction of the road but also in a direction (E' direction) in a case of assuming that the road stretches straight, and the visual attention concentration degrees Ps of each of the cases is calculated.

Then, risk may be determined based on a change or a ratio of the time sequence or the like based on the calculated visual attention concentration degrees Ps as is the case with the intersection.

Note that in a case where the curvature of a curve is large as shown in FIG. 20, a virtual ideal sight line may be set not only in the straight direction but also in a reversed direction of the bending direction of the curve. In FIG. 20, in a case of entering from the D direction, the ideal sight line may be set not only in the D' direction but also in the E' direction to calculate the visual attention concentration degrees Ps. That is, the ideal sight line may be set in a direction which is different from the bending direction of the curve.

That is, the visual saliency extraction means 3 acquires the visual saliency map acquired by estimating a level of the visual saliency in the image from an image of entering into the curve on the road, and the sight line coordinate setting means 43 sets coordinates of the ideal sight line in the image with respect to the visual saliency map in each of the bending direction of the curve and the direction which is different from the bending direction. Then, the vector error calculation means 44 calculates the visual attention concentration degrees Ps in the bending direction and the direction which is different from the bending direction in the image, based on the visual saliency map and the ideal sight line, and the output means 45 outputs the risk information at the curve based on the visual attention concentration degree Ps calculated for each exit path.

Thus, it is possible to output the information regarding the risk by evaluating the risk with respect to the target curve.

Example 4

Next, a map data generation device according to a fourth example of the present invention is explained with reference to FIGS. 21-25. Note that the same reference signs are allocated to the same portions as the above-mentioned first to third examples and explanation thereof will be omitted.

Figure 21:
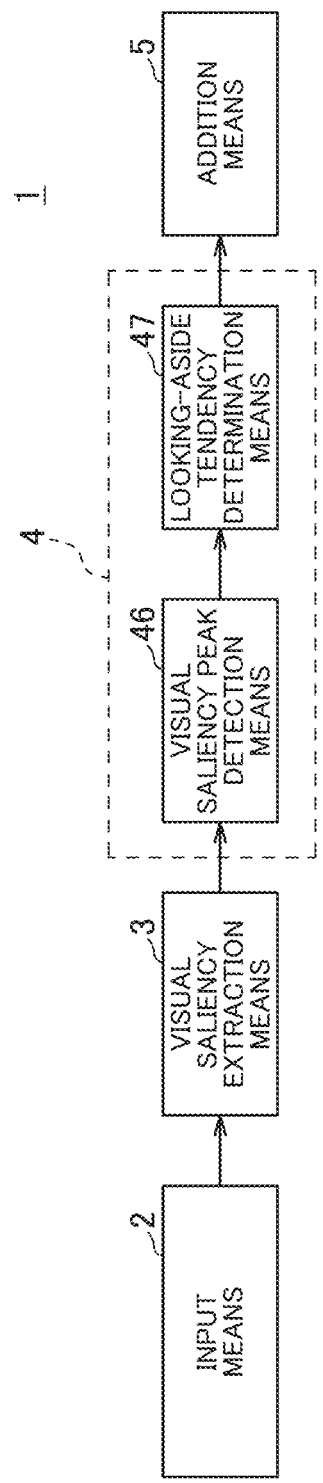
FIG. 21 is a functional configuration diagram of the map data generation device according to the fourth example of the present invention.

In the present example, a tendency of looking-aside is detected and a point or the like which requires visual attention is added to map data based on the tendency of looking-aside. As shown in FIG. 21, an analysis means 4 according to the present example includes a visual saliency peak detection means 46 and a looking-aside tendency determination means 47.

The visual saliency peak detection means 46 detects a position (pixel) which is a peak in the visual saliency map acquired by a visual saliency extraction means 3. Here, in the present example, the peak is a pixel having high visual saliency in which a pixel value is the maximum value (luminance is maximum), and a position of the peak is indicated by coordinates. That is, the visual saliency peak detection means 46 functions as a peak position detection unit to detect at least one peak position in the visual saliency map (visual saliency distribution information).

The looking-aside tendency determination means 47 determines whether or not an image inputted from an input means 2 has a tendency of looking-aside based on a position to be a peak detected by the visual saliency peak detection means 46. First, the tendency of looking-aside determination means 47 sets a gazing area (range to be gazed at) with respect to the image inputted from the input means 2. A setting method of the gazing area will be described with reference to FIG. 22. That is, the tendency of looking-aside determination means 47 functions as a gazing range setting unit to set a range at which a driver of a mobile object should gaze in the image.

Figure 22:
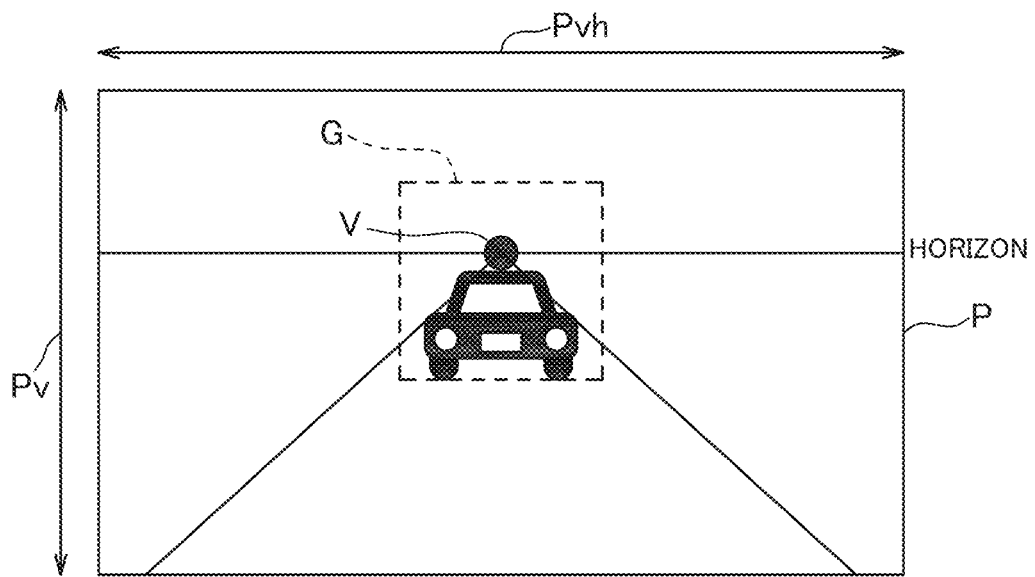
FIG. 22 is an explanatory view of a setting method of a gazing area.

In an image P shown in FIG. 22, a gazing area G is set in the surroundings of a vanishing point V. That is, the gazing area G (range to be gazed at) is set based on a vanishing point of the image. Regarding this gazing area G, a size (for example, width: 3 m and height: 2 m) of the gazing area G is set in advance, and a number of pixels of the set size can be calculated from a number of horizontal pixels, a number of vertical pixels, a horizontal angle of view, and a vertical angle of view of the image P, an inter-vehicle distance to a vehicle traveling in front, and a height of a mounting position of a camera such as a dashcam or the like capturing the image or the like. Note that the vanishing point may be estimated from a white line or the like or may be estimated using an optical flow or the like. Further, it is not necessary to detect an actual vehicle traveling in front to detect the inter-vehicle distance to the vehicle traveling in front, and the inter-vehicle distance may be set virtually.

Next, a looking-aside detection area (shaded area in FIG. 23) in the image P is set based on the set gazing area G. Each of an upper area Iu, a lower area Id, a left side area Il, and a right side area Ir is set in this looking-aside detection area. These areas are delimited by a line segment which connects the vanishing point V and each vertex of the gazing area G. That is, the upper area Iu and the left side area Il are delimited by a line segment L1 which connects the vanishing point V and a vertex Ga of the gazing area G. The upper area Iu and the right side area Ir are delimited by a line segment L2 which connects the vanishing point V and a vertex Gd of the gazing area G. The lower area Id and the left side area Il are delimited by a line segment L3 which connects the vanishing point V and a vertex Gb of the gazing area G. The lower area Id and the right side area Ir are delimited by a line segment L4 which connects the vanishing point V and a vertex Gc of the gazing area G.

Figure 23:
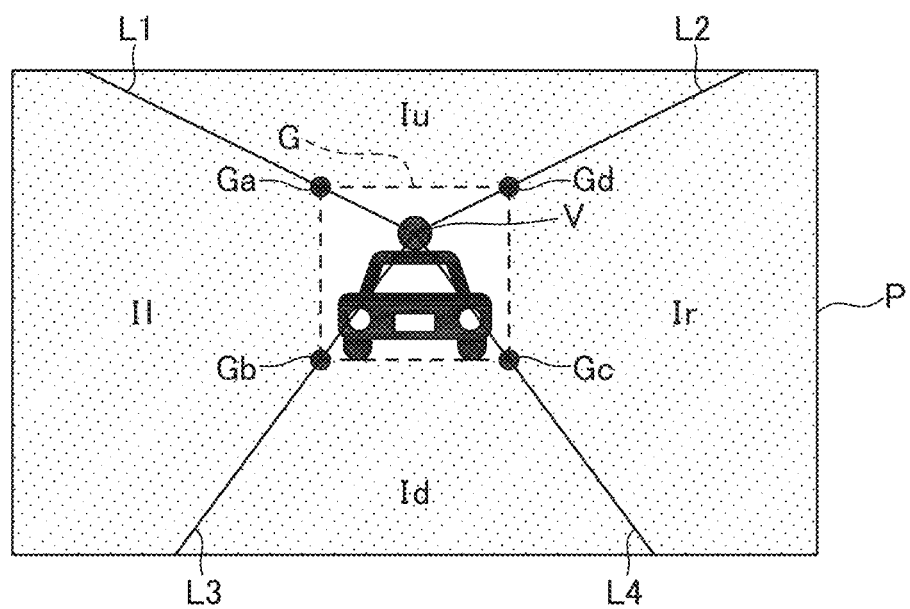
FIG. 23 is an explanatory view of a looking-aside detection area.
Figure 24:
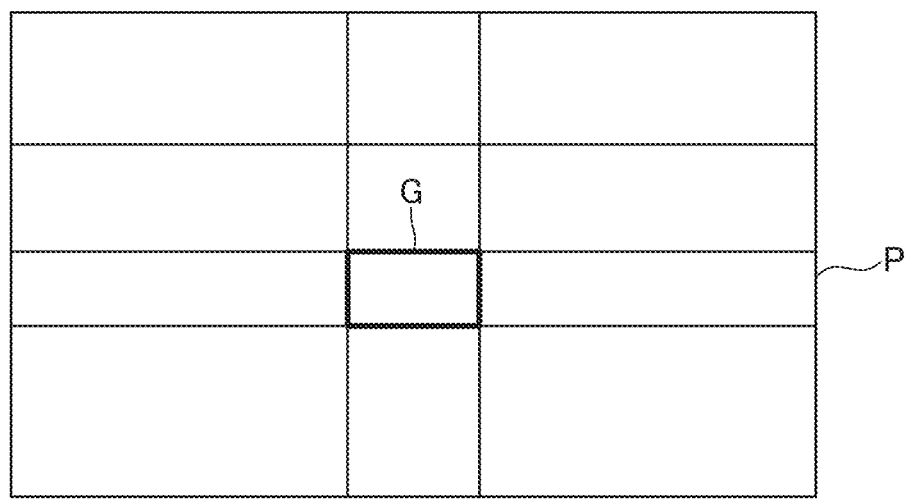
FIG. 24 is an explanatory view of another looking-aside detection area.

Note that divisions of the looking-aside detection area are not limited to the divisions shown in FIG. 23. For example, the divisions may also be as shown in FIG. 24. In FIG. 24, the looking-aside detection area is divided by line segments which are extended respective sides of the gazing area G. By using a method of FIG. 24, it is possible to reduce processing for dividing the looking-aside detection area since shapes of divided areas are simple.

Next, determination of a tendency of looking-aside in the looking-aside tendency determination means 47 is explained. When a peak position detected by the visual saliency peak detection means 46 is continuously out of the gazing area G for a predetermined time or longer, it is determined that there is the tendency of looking-aside. Here, the predetermined time may be set as, for example, two seconds, however, may also be appropriately changed. That is, the looking-aside tendency determination means 47 determines whether the peak position has been continuously out of a range to be gazed at for the predetermined time or longer.

Further, in a case where the looking-aside detection area is in the upper area Iu or the lower area Id, the looking-aside tendency determination means 47 may determine that there is the tendency of looking-aside due to a fixed object. In a case of an image in which the front is captured from a vehicle, fixed objects such as a building or a traffic light, a signage, and a street light or the like generally appear on the upper area Iu, and painting on a road such as a road sign or the like generally appears on the lower area Id. On the other hand, since a mobile object other than an own vehicle such as a vehicle or the like traveling on another traveling lane or the like may appear in the left side area Il and the right side area Ir, it is difficult to determine a looking-aside target (whether the object appearing in the area is a fixed object or mobile object) by the area.

In a case where the peak position is in the left side area Il or the right side area Ir, it is not possible to determine only by the area whether the looking-aside target is the fixed object or the mobile object, and therefore, determination is made by using an object recognition. The object recognition (also referred to as object detection) may be performed by using a well-known algorithm, and a specific method is not particularly limited.

Further, the determination of whether the looking-aside target is the fixed object or the mobile object may be performed not only by using the object recognition but also a relative speed. The relative speed is obtained from an own vehicle speed and a traveling speed of the looking-aside target between frames, and whether the looking-aside target is the fixed object or the mobile object is determined from the relative speed. Here, to obtain the traveling speed of the looking-aside target between the frames, the traveling speed of the peak position between frames may be calculated. Then, in a case where the obtained relative speed is equal to or greater than a predetermined threshold value, the looking-aside target can be determined as an object which is fixed at a certain position.

Figure 25:
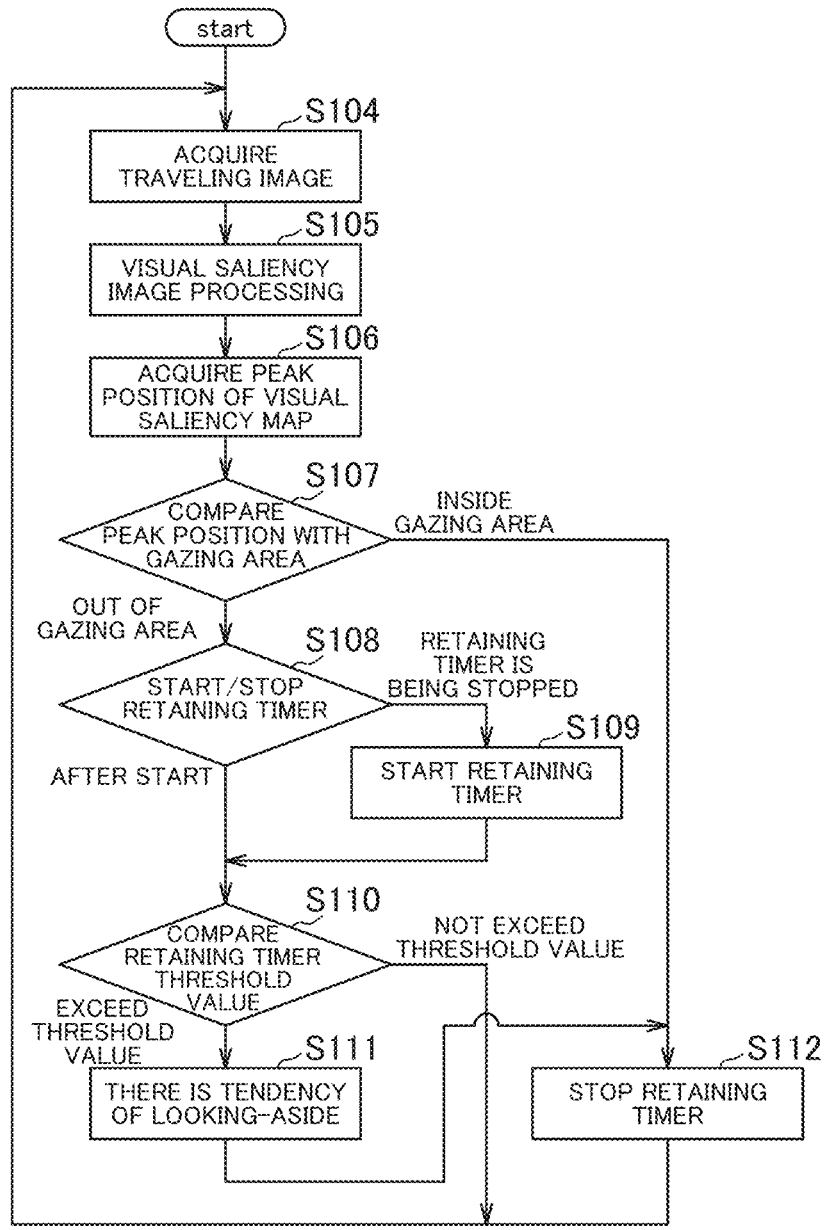
FIG. 25 is a flowchart of an operation of the map data generation device shown in FIG. 21.

Next, an operation in a map data generation device 1 of the present example is explained with reference to the flowchart of FIG. 25.

First, the input means 2 acquires a traveling image (step S104) and visual saliency image processing (acquisition of visual saliency map) is performed by the visual saliency extraction means 3 (step S105). Then, the visual saliency peak detection means 46 acquires (detects) the peak position based on the visual saliency map acquired by the visual saliency extraction means 3 in the step S105 (step S106).

Then, the looking-aside tendency determination means 47 sets the gazing area G and compares the gazing area G with the peak position acquired by the visual saliency peak detection means 46 (step S107). As a result of the comparison, if the peak position is out of the gazing area G (step S107; out of gazing area), the looking-aside tendency determination means 47 determines whether a retaining timer is after being started or is in a stopped state (step S108). The retaining timer is a timer to measure time in which the peak position is retained out of the gazing area G. Note that setting of the gazing area G may be performed when the image is acquired in the step S104.

In a case where the retaining timer is in the stopped state (step S108; in stopped state), the looking-aside tendency determination means 47 starts the retaining timer (step S109). On the other hand, in a case where the retaining timer is after being started (step S108; after being started), the looking-aside tendency determination means 47 performs a comparison of retaining timer threshold values (step S110). The retaining timer threshold value is a threshold value of time in which the peak position is retained outside the gazing area G and is set as two seconds or the like as described above.

When the retaining timer exceeds the threshold value (step S110; exceed threshold value), the looking-aside tendency determination means 47 determines a point corresponding to an image as a determination target as an attention point corresponding to a point or a section having the tendency of looking-aside (point which requires visual attention), and an addition means 5 registers (adds) the point or section to the map data according to the determination (step S111). Note that an example of the map data is the same as FIG. 11.

On the other hand, when the retaining timer does not exceed the threshold value (step S110; does not exceed threshold value), the looking-aside tendency determination means 47 does not do anything, and the flowchart returns back to the step S101.

Further, as a result of the comparison in the step S107, when the peak position is inside the gazing area G (step S107; inside gazing area), the looking-aside tendency determination means 47 stops the retaining timer (step S112).

According to the present example, the visual saliency peak detection means 46 detects at least one peak position on the visual saliency map in a time sequence. Then, the looking-aside tendency determination means 47 sets the gazing area G in the image, and if the peak position is continuously out of the gazing area G for the predetermined time or longer, the looking-aside tendency determination means 47 outputs information that there is the tendency of looking-aside, and the addition means 5 adds the point to the map data as an attention point or the like based on the information. This visual saliency map indicates a statistical degree of easiness of gathering a human sight line. Thus, a peak of the visual saliency map indicates a position in the visual saliency map at which the human sight line is most statistically easily gathered. Therefore, by using the visual saliency map, it is possible to detect the tendency of looking-aside in a simple configuration and add the tendency of looking-aside to the map data without measuring an actual sight line of a driver.

Further, the looking-aside tendency determination means 47 sets the gazing area G based on the vanishing point V of the image. Thus, it becomes possible to easily set the gazing area G without detecting, for example, a vehicle in front or the like.

Further, in a case where the looking-aside tendency determination means 47 detects that the peak position is continuously located upper or lower than the gazing area G for the predetermined time or longer, a looking-aside warning unit 6 may output information that there is the tendency of looking-aside due to the fixed object. A part which is upper than the gazing area G is an area in which the fixed objects such as the building or the traffic light, the signage, and the street light or the like generally appear, and a part which is lower than the gazing area G is an area in which the painting on a road such as the road sign or the like generally appears. That is, in a case where the peak position is included in the range, it is possible to specify that the looking-aside target by looking-aside is the fixed object.

Note that the gazing area G is not limited to be set to a fixed range. For example, the gazing area G may be changed depending on a traveling speed of a mobile object. For example, it is conventionally known that a field of view of a driver becomes narrow during the high speed traveling. Therefore, for example, the looking-aside tendency determination means 47 may acquire a vehicle speed from a speed sensor or the like mounted in a vehicle and may narrow the range of the gazing area G as the speed becomes higher. Further, since an appropriate inter-vehicle distance changes depending on the traveling speed, the range of the gazing area G by the calculation method explained with reference to FIG. 22 may be changed. The speed of the vehicle may be obtained not only from the speed sensor but also from an acceleration sensor or a captured image.

Further, the gazing area G may be changed depending on a traveling position or a status of the vehicle or the like. When the status is a status in which attention to the surroundings is required, it is necessary to widen the gazing area G. For example, a range to be gazed at changes depending on the traveling position such as, for example, a residential area, an arterial road, and a downtown or the like. In the residential area, there are a small number of pedestrians, however, it is necessary to pay attention to a sudden rush-out by a pedestrian, and thus the gazing area G cannot be made narrower. On the other hand, on the arterial road, the traveling speed becomes higher, and the field of view becomes narrower as described above.

As a specific example, it is considered that there is a danger of the rush-out by a child in a school route, a park, and the vicinity of a school. It is considered that there exist many pedestrians in the vicinity of a train station or a school, a venue of an event and the vicinity of a tourist spot or the like. It is considered that there are many bicycles in the vicinity of a bicycle-parking area and the vicinity of a school or the like. It is considered that there are many drunken people in the vicinity of an entertainment district or the like. The point or the like described above is in a state in which attention to the surroundings is required. Thus, the gazing area G may be widened, and an area which is determined to have the tendency of looking-aside may be narrowed. On the other hand, when traveling on an expressway or when traveling in an area or the like in which a volume of traffic and a population density are low, the traveling speed tends to be higher, and thus the area which is determined to have the tendency of looking-aside may be widened while narrowing the gazing area G.

Further, the gazing area G may be changed depending on a timeframe or an event or the like. For example, a commuting time period has a state in which attention to the surroundings is required, and thus the gazing area G may be widened more than the gazing area G in a regular timeframe, and the area determined to have the tendency of looking-aside may be narrowed. Further, from twilight to night also, the gazing area G may be widened as is the case with the commuting time period, and the area determined to have the tendency of looking-aside may be narrowed. On the other hand, in the middle of the night, the gazing area G may be narrowed and the area determined to have the tendency of looking-aside may be widened.

Further, the gazing area G may be changed according to event information. For example, when an event or the like is held, there is large traffic of people at a site of the event or during a timeframe of the event, and therefore the gazing area G may be widened more than usual and determination of the tendency of looking-aside may be lenient.

Information on such a point can change the range of the gazing area G when the looking-aside tendency determination means 47 acquires information from a means such as a GPS receiver or the map data or the like which can determine a current position and an area in which the vehicle is traveling, and correlates the information with image data. An information output device 1 may acquire time information from the interior or the exterior thereof. The event information may be acquired from an external website or the like. Further, the determination of the change may be performed by combining a position and time/date, or the determination may be performed by using any one of the position and the time/date.

In addition, when travelling at a high speed, the retaining timer threshold value may be shortened. This is due to that even looking-aside for a short period of time may cause a dangerous situation when travelling at the high speed.

Example 5

Next, a map data generation device according to a fifth example of the present invention is explained with reference to FIG. 26. Note that the same reference signs are allocated to the same portions as the above-mentioned first to fourth examples and explanation thereof will be omitted.

In the present example, a monotonous road is detected, and based on a detected result, a point or the like which requires visual attention is added to map data. An analysis means 4 according to the present example determines a monotonous road (tendency of monotone) as described above. The monotonous road generally means a road without a change of a scenery or with a poor change of a scenery or a road along which a monotonous landscape or scenery continues such as a road or an expressway or the like which has street lights or the like provided regularly at constant intervals.

The analysis means 4 determines, based on a visual saliency map acquired by the visual saliency extraction means 3, whether or not an image inputted to an input means 2 has the tendency of monotone. In the present example, various statistical amounts are calculated from the visual saliency map, and whether or not the image has the monotonous tendency is determined based on the statistical amounts. That is, the analysis means 4 functions as a monotone determination unit which determines whether or not the image has the tendency of monotone, wherein the determination is performed by using a statistical amount calculated based on the visual saliency map (visual saliency distribution information).

Figure 26:
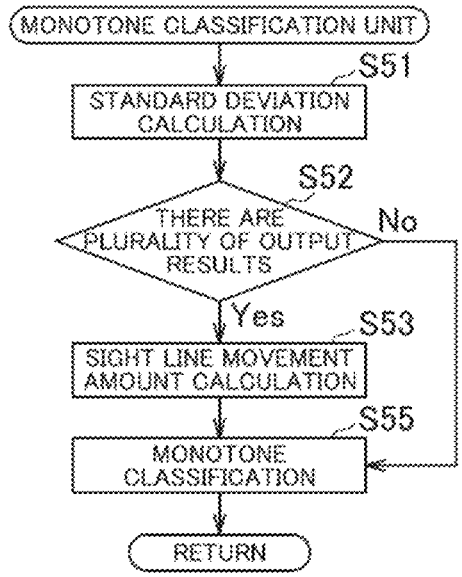
FIG. 26 is a flowchart of an operation of the map data generation device according to the fifth example of the present invention.

A flowchart of an operation of the analysis means 4 is shown in FIG. 26. First, a standard deviation of luminance of each pixel in an image which constitutes the visual saliency map (for example FIG. 3B) is calculated (step SM). In the present step, first, an average value of the luminance of each pixel in the image which constitutes the visual saliency map is calculated. Assuming that the image which constitutes the visual saliency map is H pixels x V pixels, and that luminance value at arbitrary coordinates (k, m) is $V_{VC\,(k,\,m)}$, the average value is calculated by a formula (2) below.

[Formula 2]

$$\overline{V_{VC}} = \frac{\sum_{m=0}^{V-1} \sum_{k=0}^{H-1} V_{VC(k,m)}}{V \times H} \quad (2)$$

The standard deviation of the luminance of each pixel in the image which constitutes the visual saliency map is calculated from the average value calculated by formula (2). A standard deviation SDEV is calculated by a formula (3) below.

[Formula 3]

$$SDEV = \sqrt{\frac{\sum_{m=0}^{V-1} \sum_{k=0}^{H-1} \left(V_{VC(k,m)} - \overline{V_{VC}}\right)^2}{V \times H}} \quad (3)$$

Whether or not there are a plurality of output results is determined with respect to the standard deviation calculated in the step SM (step S52). In this step, an image inputted from the input means 2 is a moving image, and the visual saliency map is acquired per frame, and in the step S51, whether or not standard deviations of a plurality of frames are calculated is determined.

In a case where there are a plurality of output results (step S52; Yes), a sight line movement amount is calculated (step S53). In the present example, the sight line movement amount is obtained by a distance of coordinates at which the luminance value is the greatest (highest) on the visual saliency map of each of frames which are temporarily preceding and subsequent. Assuming that coordinates of the greatest luminance value at a preceding frame is (x1, y1) and coordinates of the greatest luminance value at a subsequent frame is (x2, y2), a sight line movement amount VSA is calculated by a formula (4) below.

[Formula 4]

$$VSA = \sqrt{(x_2 - x_1)^2 + (y_2 - y_1)^2} \quad (4)$$

Then, whether or not the sight line movement amount has a tendency of monotone is determined based on the standard deviation calculated in the step S51 or the sight line movement amount calculated in the step S53 (step S55). In the present step, in a case where it is determined as "No" in the step S52, a threshold value is provided to the standard deviation calculated in the step S51, and then whether or not there is the tendency of monotone may be determined by comparing the standard deviation with the threshold value. On the other hand, in a case where it is determined as "Yes" in the step S52, a threshold value is provided to the sight line movement amount calculated in the step S53, and then whether or not there is the tendency of monotone may be determined by comparing the sight line movement amount with the threshold value by comparing the sight line movement amount with the threshold value.

That is, the analysis means 4 functions as a standard deviation calculation unit which calculates the standard deviation of the luminance of each pixel in the image acquired as the visual saliency map (visual saliency distribution information), and functions as a sight line movement amount calculation unit which calculates the sight line movement amount between frames based on images which are obtained as the visual saliency map in a time sequence (visual saliency distribution information).

Note that, in a case where it is determined as a result of processing of the analysis means 4 (determination result) that there is the tendency of monotone, the determination result is outputted to an addition means 5. Then, in the addition means 5, a point or a section indicated by the image determined to have the tendency of monotone is registered (added) to the map data as an attention point (point requiring attention). Note that an example of a map in the present example is the same as FIG. 11.

According to the present example, the analysis means 4 determines whether or not the image has the tendency of monotone, the determination is performed based on the standard deviation or the sight line movement amount or the like calculated based on the visual saliency map. Thus, it becomes possible to determine whether or not there is the tendency of monotone, from a captured image based on a position at which a human being can easily gaze. Since the determination is made based on the position at which the human being (driver) can easily gaze, a determination can be made with a tendency which is close to how the driver feels monotonous, and it is possible to determine with higher accuracy and add the determination to the map data based on the determination result.

Further, the analysis means 4 may calculate the average value of the luminance of each pixel in the image which is obtained as the visual saliency map, and then may determine based on the calculated average value whether or not the image has the tendency of monotone. Thus, when positions to be easily gazed at are concentrated in one image, it is possible to determine that there is the tendency of monotone. Further, arithmetic processing can be simplified since the determination is made by the average value.

Further, the analysis means 4 calculates the sight line movement amount between the frames based on the images which are obtained as the visual saliency map in a time sequence, and then determines whether or not there is the tendency of monotone, based on the calculated sight line movement amount. Thus, when determining with respect to the moving image, it is possible to determine that there is the tendency of monotone or the like in a case where, for example, the sight line movement amount is small.

Example 6

Next, a map data generation device according to a sixth example of the present invention is explained with reference to FIGS. 27-28. Note that the same reference signs are allocated to the same portions as the above-mentioned first to fifth examples and explanation thereof will be omitted.

In the present example, it is possible to determine that there is a tendency of monotone even in a case in which a non-detection is caused in the method of the fifth example, particularly when there are a plurality of output results (moving image). A block configuration or the like in the present example is the same as that of the fifth example. A flowchart of an operation of an analysis means 4 according to the present example is shown in FIG. 27.

Figure 27:
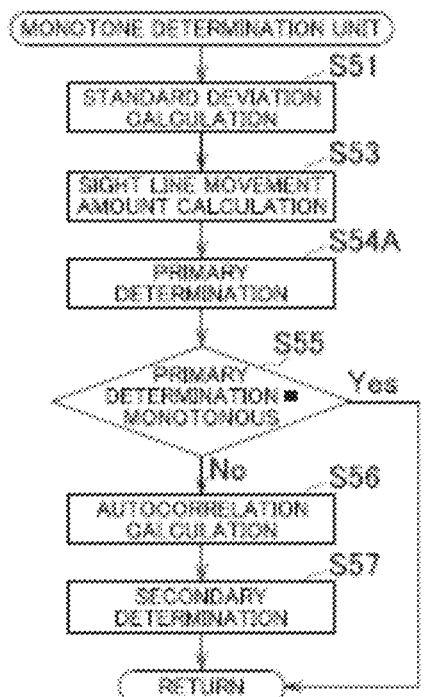
FIG. 27 is a flowchart of an operation of the map data generation device according to the sixth example of the present invention.

A step SM and a step S53 in the flowchart of FIG. 27 are the same as the step SM and the step S53 in FIG. 26. Note that, in the present example, a target image is a moving image since autocorrelation is used as described later, therefore, the step S52 is omitted. A determination content of a step S54A is the same as that of the step SM. This step S54A is performed as a primary determination regarding the tendency of monotone in the present example.

Next, as a result of determination of the step S54A, in a case where there is the tendency of monotone (step S55; Yes), the determination result is outputted to the outside of a determination device 1 as is the case with FIG. 26. On the other hand, as the result of the determination in the step S54A, in a case where there is no tendency of monotone (step S55; No), an autocorrelation calculation is performed (step S56).

In the present example, the autocorrelation is calculated by using the standard deviation (luminance average value) or a sight line movement amount calculated in the step S51 or the step S53. It is conventionally known that an autocorrelation $R_{(k)}$ is calculated by a formula (5) below when an expected value is E, an average of X is $\mu$, a variance of X is $\sigma^2$, and a lag is k. In the present example, k is changed within a predetermined range and then a calculation of the formula (5) is performed, and the greatest calculated value is an autocorrelation value.

[Formula 5]

$$R_{(k)} = \frac{E[(X_i-\mu)(X_{i+k}-\mu)]}{\sigma^2} \quad (5)$$

Then, whether or not there is the tendency of monotone is determined based on the calculated autocorrelation value (step S57). As is the case with the fifth example, the determination may be performed by providing a threshold value for the autocorrelation value and by comparing the autocorrelation value with the threshold value. For example, when the autocorrelation value at k=k1 is greater than the threshold value, it means that a similar scenery is repeated for each k1. When it is determined that there is the tendency of monotone, the image of the scenery is categorized as an image having the tendency of monotone. By calculating such an autocorrelation value, it becomes possible to determine a road having the tendency of monotone caused by objects which are periodically arranged such as street lights or the like provided regularly at constant intervals.

An example of a calculation result of the autocorrelation is shown in FIG. 28. FIG. 28 is a correlogram on the luminance average value of a visual saliency map regarding a traveling moving image. A vertical axis indicates a correlation function (autocorrelation value) and a horizontal axis indicates the lag in FIG. 28. Further, in FIG. 28, in a shaded portion, a confidence interval is 95% (significance level $\alpha s=0.05$), and when a null hypothesis is "there is no periodicity at the lag k" and an alternative hypothesis is "there is a periodicity at the lag k", it is determined that data in the shaded portion has no periodicity since the null hypothesis cannot be discarded and that data which exceeds the shaded portion is determined to have the periodicity regardless of whether the data is positive or negative.

FIG. 28A is a moving image of traveling in a tunnel, and an example of data having the periodicity. It can be observed that there is the periodicity in tenth data and seventeenth data according to FIG. 28A. In a case of the tunnel, since lighting in the tunnel is provided at constant intervals, it is possible to determine the tendency of monotone caused by the lighting or the like. On the other hand, FIG. 28B is the moving image of traveling on a general road, and an example of data having no periodicity. According to FIG. 28B, almost all of the data are within the confidence interval.

By operation as shown in the flowchart of FIG. 27, first, whether or not the data is monotonous is determined by an average, the standard deviation, and a sight line movement amount, and it becomes possible to perform a secondary determination with respect to the data which are not selected as monotonous, with the viewpoint of the periodicity.

According to the present example, the visual saliency map is acquired in a time sequence, and the analysis means 4 calculates a statistical amount from the visual saliency map which is acquired in a time sequence, and functions as a primary determination unit which determines whether or not there is the tendency of monotone, based on the statistical amount acquired in a time sequence, and a secondary determination unit which determines based on the autocorrelation whether or not there is the monotonous tendency. Thus, based on the autocorrelation, it is possible to determine the tendency of monotone by an object which periodically appears such as a street light appearing during traveling or the like which is difficult to determine only by the statistical amount.

Note that the above-mentioned first to sixth examples may be combined. That is, pieces of information of a plurality of examples may be simultaneously displayed on the map shown in FIG. 11. When displaying the pieces of information simultaneously, it is preferable that a color or a shape or the like of the pieces of information is changed such that which information indicates in a distinguishable manner which attention point it is.

Further, the present invention is not limited to the examples described above. That is, a person skilled in the art can carry out the present invention in various variations within the scope of the core of the present invention according to conventional knowledge. Such variations are, in so far as the map data generation device of the present invention is included therein, of course, within the scope of the present invention.

REFERENCE SIGNS LIST 1 map data generation device
2 input means (acquisition unit)
3 visual saliency extraction means (generating unit)
4 analysis means (analysis unit, monotone determination unit, fourth determination unit)
5 addition means (addition unit)
41 visual recognition load amount calculation means (movement amount calculation unit)
42 visual recognition load determination means (first determination unit)
43 sight line coordinate setting means (sight line position setting unit)
44 visual attention concentration degree calculation means (visual attention concentration degree calculation unit)
45 output means (second determination unit)
46 visual saliency peak detection means (peak position detection unit, gazing range setting unit)
47 tendency of looking-aside determination unit (looking-aside output unit, third determination unit)

The invention claimed is:

1. A map data generation device comprising:
one or more processors configured to:
acquire input information in which an image in which an outside is captured from a mobile object and position information of the mobile object are associated,
acquire visual saliency distribution information obtained by estimating a level of visual saliency in the image based on the image,
calculate a movement amount of an estimated gazing point based on the visual saliency distribution information by estimating that the estimated gazing point is a position on the image in which the visual saliency becomes the maximum in the visual saliency distribution information, the movement amount of the calculated estimated gazing point being based on a time sequence,
determine, based on the movement amount of the calculated estimated gazing point, whether or not a visual recognition load tendency is high at a point or a section, and
add, upon a result of the determination that the visual recognition load tendency is high at the point or the section, attention information with the point or the section as a point or a section which requires visual attention, to map data.

2. The map data generation device according to claim 1, wherein the one or more processors is configured to determine whether or not the visual recognition load tendency is high at the point or the section by comparing the movement amount of the calculated estimated gazing point with a first threshold value.

3. The map data generation device according to claim 2, wherein the one or more processors is configured to:
convert the image to mappable intermediate data,
convert the intermediate data to mapping data by performing an extraction of characteristics with respect to the intermediate data to obtain extracted data, and performing up-sampling of the extracted data, and
generate saliency estimation information indicating a saliency distribution based on the mapping data.

4. The map data generation device according to claim 2, wherein the one or more processors is configured to calculate the movement amount by estimating that the estimated gazing point is a position on the image in which the visual saliency becomes the maximum in the visual saliency distribution information.

5. The map data generation device according to claim 1, wherein the one or more processors is configured to:
convert the image to mappable intermediate data,
convert the intermediate data to mapping data by performing an extraction of characteristics with respect to the intermediate data to obtain extracted data, and performing up-sampling of the extracted data, and
generate saliency estimation information indicating a saliency distribution based on the mapping data.

6. A map data generation device comprising:
one or more processors configured to:
acquire input information in which an image in which an outside is captured from a mobile object and position information of the mobile object are associated,
acquire visual saliency distribution information obtained by estimating a level of visual saliency in the image based on the image,
set a reference sight line position in the image according to a predetermined rule, the reference sight line position corresponding to a sight line along a traveling direction of the mobile object in a traffic environment in which there is no obstacle or other mobile object, calculate a visual attention concentration degree with respect to the reference sight line position based on a visual saliency of each position constituting the visual saliency distribution information, determine, based on the visual attention concentration degree, whether or not a point or a section has a high risk, and add, upon a result of the determination that the point or the section has the high risk, attention information with the point or the section as a point or a section which requires visual attention, to map data.

7. The map data generation device according to claim 6, wherein the one or more processors is configured to acquire the visual saliency distribution information for each approach path from an image of each approach path which is a road to enter an intersection, wherein with respect to the visual saliency distribution information, the one or more processors is configured to respectively set the reference sight line position in the image for each exit path which is a road to get out after entering the intersection, wherein the one or more processors is configured to calculate the visual attention concentration degree for each exit path in the image, and wherein the one or more processors is configured to determine, based on the visual attention concentration degree for each exit path, whether or not the intersection has a high risk.

8. The map data generation device according to claim 7, wherein the one or more processors is configured to:
convert the image to mappable intermediate data,
convert the intermediate data to mapping data by performing an extraction of characteristics with respect to the intermediate data to obtain extracted data, and performing up-sampling of the extracted data, and
generate saliency estimation information indicating a saliency distribution based on the mapping data.

9. The map data generation device according to claim 6, wherein the one or more processors is configured to:
convert the image to mappable intermediate data,
convert the intermediate data to mapping data by performing an extraction of characteristics with respect to the intermediate data to obtain extracted data, and performing up-sampling of the extracted data, and
generate saliency estimation information indicating a saliency distribution based on the mapping data.

10. A map data generation method executed by a map data generation device, the map data generation device adding predetermined information to map data based on an image in which an outside is captured from a mobile object, the map data generation method comprising:
acquiring input information in which the image and the position information of the mobile object are associated;

acquiring visual saliency distribution information obtained by estimating a level of visual saliency in the image based on the image;

calculating a movement amount of an estimated gazing point based on the visual saliency distribution information by estimating that the estimated gazing point is a position on the image in which the visual saliency becomes the maximum in the visual saliency distribution information, the movement amount of the calculated estimated gazing point being based on a time sequence;

determining, based on the movement amount of the calculated estimated gazing point, whether or not a visual recognition load tendency is high at a point or a section; and adding, upon a result of the determination that the visual recognition load tendency is high at the point or the section, attention information with the point or the section as a point or a section which requires visual attention, to map data.

11. A non-transitory computer-readable storage medium on which a map data generation program is stored, the map data generation program being configured to cause a computer to execute the map data generation method according to claim 10.

12. A map data generation method executed by a map data generation device, the map data generation device adding predetermined information to map data based on an image in which an outside is captured from a mobile object, the map data generation method comprising:
acquiring input information in which the image and the position information of the mobile object are associated;

acquiring visual saliency distribution information obtained by estimating a level of visual saliency in the image based on the image;

setting a reference sight line position in the image according to a predetermined rule, the reference sight line position corresponding to a sight line along a traveling direction of the mobile object in a traffic environment in which there is no obstacle or other mobile object;

calculating a visual attention concentration degree with respect to the reference sight line position based on a visual saliency of each position constituting the visual saliency distribution information;

determining, based on the visual attention concentration degree, whether or not a point or a section has a high risk; and adding, upon a result of the determining that the point or the section has a high risk, attention information with the point or the section as a point or a section which requires visual attention, to map data.

13. A non-transitory computer-readable storage medium on which a map data generation program is stored, the map data generation program being configured to cause a computer to execute the map data generation method according to claim 12.

* * * * *